US011893641B2

(12) United States Patent
Blair et al.

(10) Patent No.: US 11,893,641 B2
(45) Date of Patent: *Feb. 6, 2024

(54) SENTIMENT AND RULES-BASED EQUITY ANALYSIS USING CUSTOMIZED NEURAL NETWORKS IN MULTI-LAYER, MACHINE LEARNING-BASED MODEL

(71) Applicant: AGBLOX, INC., Irvine, CA (US)

(72) Inventors: Thomas N. Blair, Irvine, CA (US); Alex A. Kurzhanskiy, Albany, CA (US); Spyros J. Lazaris, Los Angeles, CA (US); Leo Richard Jolicoeur, Reno, NV (US); Michael G. Mcerlean, Sioux Falls, SD (US); Tony Chiyung Lei, Reno, NV (US); Craig I. Forman, San Francisco, CA (US)

(73) Assignee: AGBLOX, INC., Irvine, CA (US)

( * ) Notice: Subject to any disclaimer, the term of this patent is extended or adjusted under 35 U.S.C. 154(b) by 539 days.

This patent is subject to a terminal disclaimer.

(21) Appl. No.: 17/240,961

(22) Filed: Apr. 26, 2021

(65) Prior Publication Data
US 2022/0036461 A1  Feb. 3, 2022

Related U.S. Application Data

(63) Continuation of application No. 17/135,784, filed on Dec. 28, 2020, now Pat. No. 10,991,048, which is a (Continued)

(51) Int. Cl.
*G06Q 40/06* (2012.01)
*G06N 20/00* (2019.01)
(Continued)

(52) U.S. Cl.
CPC ............ *G06Q 40/06* (2013.01); *G06F 18/24* (2023.01); *G06F 40/20* (2020.01); *G06N 3/08* (2013.01);
(Continued)

(58) Field of Classification Search
USPC ...................................................... 705/36 R
See application file for complete search history.

(56) References Cited

U.S. PATENT DOCUMENTS 7,529,703 B2   5/2009  Benzschawel et al.
8,856,056 B2  10/2014  Di Sciullo et al.
(Continued)

OTHER PUBLICATIONS

Yan et al., "Predicting Stock Using Microblog Moods", Aug. 2016, China Communications, p. 244-257. (2016).
(Continued)

*Primary Examiner* — Ishrat I Sherali
(74) *Attorney, Agent, or Firm* — LAZARIS IP

(57) ABSTRACT

A data analytics platform is provided for forecasting future states of commodities and other assets, based on processing of both textual and numerical data sources. The platform includes a multi-layer machine learning-based model that extracts sentiment from textual data in a natural language processing engine, evaluates numerical data in a time-series analysis, and generates an initial forecast for the commodity or asset being analyzed. The platform includes multiple applications of neural networks to develop augmented forecasts from further analysis of relevant information as it is collected. These include commodity-specific neural networks designed to continually develop taxonomies used to process commodity sentiment, and applications of reinforcement learning, symbolic networks, and unsupervised meta learning to improve overall performance and accuracy of the forecasts generated.

33 Claims, 7 Drawing Sheets

Related U.S. Application Data continuation of application No. 16/945,169, filed on Jul. 31, 2020, now Pat. No. 10,878,505.

(51) Int. Cl.
  *G06N 3/08* (2023.01)
  *G06F 40/20* (2020.01)
  *G06F 18/24* (2023.01)
  *G06V 10/764* (2022.01)
  *G06V 10/82* (2022.01)

(52) U.S. Cl.
  CPC .......... *G06N 20/00* (2019.01); *G06V 10/764* (2022.01); *G06V 10/82* (2022.01)

(56) References Cited

U.S. PATENT DOCUMENTS

| | | | |
|---|---|---|---|
| 9,104,734 | B2 | 8/2015 | Blaschad et al. |
| 10,039,909 | B2 | 8/2018 | Bangera et al. |
| 10,354,342 | B2 * | 7/2019 | Kuper .................... G16H 50/20 |
| 10,878,505 | B1 | 12/2020 | Blair et al. |
| 10,991,048 | B1 | 4/2021 | Blair et al. |
| 11,257,161 | B2 * | 2/2022 | Sisk ........................ G06Q 40/06 |
| 11,475,379 | B2 * | 10/2022 | Khan ...................... G06Q 10/04 |
| 11,537,847 | B2 * | 12/2022 | Calmon ............. G06Q 30/0201 |
| 2012/0296845 | A1 * | 11/2012 | Andrews ............... G06Q 40/06 |
| | | | 705/36 R |
| 2016/0170814 | A1 | 6/2016 | Li |
| 2016/0321750 | A1 | 11/2016 | He |
| 2018/0053255 | A1 * | 2/2018 | Valdyanathan ...... G06Q 10/067 |
| 2019/0073413 | A1 | 3/2019 | Kim |
| 2019/0251626 | A1 | 8/2019 | Jezewski |
| 2021/0027319 | A1 | 1/2021 | Schwenkler |

OTHER PUBLICATIONS

Papaioannou et al., "Can Social Microblogging Be Used To Forecast Intraday Exchange Rates?", Oct. 26, 2013, Springer Science+Business Media New York, p. 47-68. (2013).

Patent Cooperation Treaty, International Searching Authority, International Search Report, PCT/US2021/043984.

Patent Cooperation Treaty, International Searching Authority, Written Opinion of the International Searching Authority, PCT/US2021/043984.

* cited by examiner

SENTIMENT AND RULES-BASED EQUITY ANALYSIS USING CUSTOMIZED NEURAL NETWORKS IN MULTI-LAYER, MACHINE LEARNING-BASED MODEL

CROSS-REFERENCE TO RELATED PATENT APPLICATION(S)

This patent application claims priority to, and is a continuation of, U.S. non-provisional application Ser. No. 17/135,784, filed on Dec. 28, 2020 (issuing as U.S. Pat. No. 10,991,048 on Apr. 27, 2021), and U.S. non-provisional application Ser. No. 16/945,169, filed on Jul. 31, 2020 (now U.S. Pat. No. 10,878,505 issued on Dec. 29, 2020), the contents of all of which are incorporated in their entirety herein. In accordance with 37 C.F.R. § 1.76, a claim of priority to each of these applications and patents is included in an Application Data Sheet filed concurrently herewith.

FIELD OF THE INVENTION

The present invention relates to data processing and analytics in a multi-layer, machine learning-based computing environment. Specifically, the present invention relates to analyzing data collected from structured and unstructured sources, and applying elements of machine learning to both statistical processing and natural language processing of such sources to develop a comprehensive sentiment analysis to discern trends, classifications, and forecasts for agricultural and other commodities.

BACKGROUND OF THE INVENTION

A commodity state is any condition or characteristic reflecting that commodity. A commodity state may represent its utility, quality, value, any other aspect thereof. There are many existing approaches for assessing commodities and forecasting the future states of such commodities. These existing approaches range from simply looking at graphs and charts of commodity values over time, and trying to guess their fluctuations, either in the moment or at some point in the future, typically for the purpose of purchasing or agreeing to futures contracts, forwards, and swaps. Other existing approaches include performing classical statistical analyses on various types of historical data.

Such existing approaches have the practical limitation of producing crude and unreliable results for longer time horizons, such as where one wants to forecast a commodity state three months or more into the future. This is at least because these approaches are one-dimensional, in that they fail to take into account other, non-traditional data sources. Still further, these approaches fail to include a comparison of information from such non-traditional, data sources in a temporal look-back that would help to determine if longer term forecasts based on prior statistical analyses could have been improved, had different and better information been available.

Existing approaches have also begun to incorporate elements of artificial intelligence by applying aspects of machine learning to develop predictions and forecasts of commodity states. Such applications are limited however by the inability to process large amounts of data from both historical pricing data and other, non-traditional data sources, which can be analyzed in differing temporal contexts (i.e. over time and in real time). The complex nuances of evaluating different types and sources of data, in addition to the large amounts of data which are available, produces inherent limitations in the use of machine learning.

Machine learning is an application of artificial intelligence in which algorithms are deployed to evaluate data, learn from that data, and make informed decisions based on what was learned. Specific machine learning models can be developed to focus on particular issues to be solved by such informed decisions. Deep learning is a subset of machine learning that takes it further by structuring those algorithms in layers to create an "artificial neural network" that is able to learn and make intelligent decisions by itself. While basic machine learning models by their nature become progressively better at whatever their function is, they still need some guidance, particularly where predictions and forecasts are being developed on which further decisions will be relied upon. If an artificial intelligence algorithm returns an inaccurate prediction, then an engineer has to step in and make adjustments, or confidence will be lost in the model's ability to perform. By developing and applying a deep learning aspect to the model, the algorithm(s) can determine on its own if a prediction is accurate or not through its own neural network.

Price discovery, as noted below, is the overall process of setting a spot price or the proper price of an asset, security, commodity, or currency. The process of price discovery looks at a number of tangible and intangible factors, and there are many available tools in the existing art for ingesting and absorbing information to enable price discovery. However, there exists a constantly growing amount of such information, from both traditional and non-traditional sources, particularly with the advent, proliferation and popularity of Internet-based sources such as social media (microblogging), podcasting, and the general wider dissemination of news articles that exists today. This ever-growing amount of information creates opportunities for data gathering, but also creates a lot of noise; relevant information must be filtered and absorbed quickly, and there is an increasing need for tools that are able to perform this filtering and absorption. Therefore, there remains a continuing need in the existing art for processing large amounts of data and information to discern trends that can help predict and forecast condition and value in assets such as commodities at specified points in the future.

Podcasts are digital audio files made available on the Internet for downloading to a computer or mobile device, typically available as a series, and are becoming more and more popular forms of entertainment where the emphasis is on audio and the spoken word. This popularity has produced an explosion in content produced by the podcast industry, which has resulted in a rapid increase in the amount of audio content available as a potentially rich and a very large source of audio data. For example, as of July 2019, podcasts reach more than 155 countries in over 100 languages.

However, currently it is very hard to find interesting and relevant podcast content. The limiting factor in the growth of podcasts is the friction in accessing content. For people who have not listened to podcasts before, it can be difficult to know how to find them. Existing technology for discovering podcast content is limited in that there are no current platforms that provide recommendations for consuming new content based on shows that users already like. Continuing to serve relevant content is key to retaining listeners over time.

Additionally, quantifying this large set of audio data has the potential to reveal trends, patterns, characteristics, and industry sentiment that may go initially unnoticed by human interpretation. Existing technology does not currently enable the mining of such a large set of audio data, and there are no tools available to the data scientist to easily extract or leverage information derived from spoken-word content in podcasts.

Still further, podcasts are often very long, and there is no current approach to identifying content of interest within a podcast. For example, a user researching a particular topic of interest often has to sift through an entire podcast before locating a portion of that podcast which is useful.

Accordingly, there is a continuing need in the existing art for tools that sift through the large amount of available podcasts, and enable podcast discovery to help users determine what to listen to, and also to identify relevant portions of podcasts that are of interest,

BRIEF SUMMARY OF THE INVENTION

The present invention is a software platform designed, in a general sense, to augment human expertise with machine learning systems and domain-specific knowledge, and to automate complex operations that require cognition, skill, expertise, and knowledge. More specifically, the present invention is a data analytics platform that incorporates analysis of both structured and unstructured data sources.

The data analytics platform includes a natural language analysis that is an unsupervised machine learning process for identifying sentiment in previously unknown data points in unstructured data sources, and a time-series analysis that is a supervised machine learning process that evaluates temporal correlations between data points in the structured data sources. Together, these analyses feed an algorithm designed to model certain attributes of commodities and other assets.

The natural language analysis, time series analysis, and forecasting algorithm are elements of a multi-layer, machine learning-based model forecasting characteristics of commodities and other assets, such as a state of a commodity at some future time. The multi-layer, machine learning-based model includes applications of neural networks that are designed to enhance the performance of the elements of the data analytics platform and augment forecasts generated therein.

It is one objective of the present invention to provide systems and methods of forecasting conditions, states, and characteristics of commodities and other assets. It is another objective of the present invention to provide systems and methods of applying advanced data analytics to such forecasting. It is yet another objective of the present invention to systems and methods of analyzing both structured and unstructured data sources for such forecasting. It is still another objective of the present invention to provide systems and methods of analyzing sentiment to perform sentiment discovery in multiple, unstructured data sources, and combining such sentiment with a time-series analysis of commodity characteristics in structured data sources. It is another objective of the present invention to perform an analysis of both structured and unstructured data sources in a multi-layer, machine learning-based model for such forecasting that includes both supervised and unsupervised machine learning approaches.

It is another objective of the present invention to apply multiple levels of machine learning algorithms to forecasts of commodity states. It is a further objective of the present invention augment the forecasts by developing commodity-specific neural networks designed to continuously identify factors indicative of commodity sentiment, and use relationships derived from such neural networks to adjust initial forecasts. It is still another objective of the present invention to provide a framework for gamification of such multiple levels of machine learning algorithms, to continuously model forecasting algorithms and identify most appropriate mathematical models and algorithms for increasing accuracy in such forecasts. It is a further objective of the present invention to integrate a knowledge-based approach into such neural networks that applies rules developed from fundamental economic and commodity-specific indicators in forecasting commodity states. It is yet another objective of the present invention to generate output data representative of price discovery based on forecasts of conditions, states, and characteristics of commodities and other assets, and present this output data to users to act on the information therein.

The present invention is, in another embodiment thereof, a software platform for processing audio files. More specifically, the present invention is an audio file processing and analytics framework that is an application of the data analytics platform above, configured for searching for and identifying and extracting information from audio files such as example podcasts, and semantically processing extracted information to generate content in response to search queries. Such a framework provides a narrow-cast of hyper-personalized audio segments tuned to a user's personal profile, and provides lists of personalized podcasts with an index to the precise location of interest, together with links to the podcast, and displays of such lists and links as well as content generated from searches of semantically-processed information.

Podcast transcripts are a unique form of text. Because their initial intent was to be listened to, not read, the framework first extracts and transcribes podcast content in a podcast discovery engine that then loads pre-processed content for a further classification and sentiment analysis. This allows for identification and quantification of podcast content that is responsive to a user's interests. The podcast discovery engine enables applications and administrative tools to sort and manage podcasts and other audio files, including audio extracted from video streams, to examine the tone, emotional association, and personalized relevance of the content.

It is one objective of the present invention to provide a system and method of providing a technique for podcast discovery that allows users to quickly identify and consume podcasts that are related to identified interests. It is another objective of the present invention to provide a system and method of identifying content in a large-scale universe of podcast audio files. It is still another objective of the present invention to provide a system and method of extracting information from podcast audio files for further processing of content therein in semantically-based podcast discovery. It is yet another objective of the present invention to provide a system and method of applying data analytics to such large-scale collection of content extracted from podcast audio files to further identify content of interest that is specific to a user. It is still another objective of the present invention to provide mechanisms that allows users to engage with identified content extracted from podcasts that is related to user interests, and enables follow-on utility in a podcast discovery tool for locating, accessing, and consuming podcasts.

Other objects, embodiments, features, and advantages of the present invention and its embodiments will become apparent from the following description of the embodiments, taken together with the accompanying drawings, which illustrate, by way of example, principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

Figure 1A:
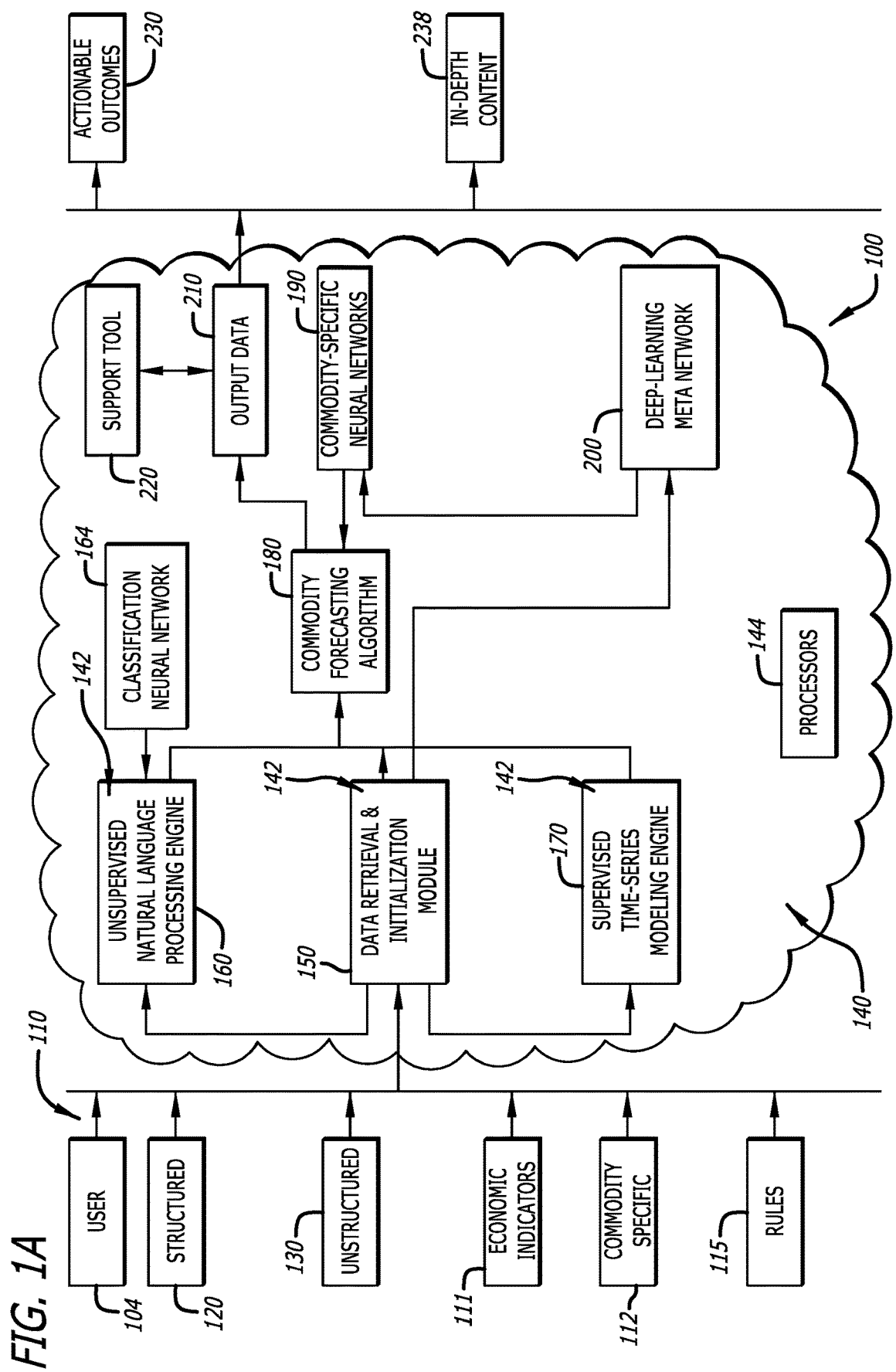
FIG. 1A is a system diagram illustrating elements of a data analytics platform according to one embodiment of the present invention.

In the following description of the present invention, reference is made to the exemplary embodiments illustrating the principles of the present invention and how it is practiced. Other embodiments will be utilized to practice the present invention and structural and functional changes will be made thereto without departing from the scope of the present invention.

The present invention is a data analytics platform 100 that is provided in one or more systems and methods for, in one aspect thereof, utility in the process of analyzing commodity volatility over time. The data analytics platform 100 is, in one aspect of the present invention, a multi-layer, machine learning-based model for this process, and utilizes the commodity volatility for forecasting future commodity states, using multiple and disparate information from many different sources.

The data analytics platform 100 according to this aspect of the present invention processes input data 110 that includes both structured data 120 and unstructured data 130 within the multi-layer, machine learning-based model by executing a plurality of algorithms to arrive as noted above to generate asset-specific or commodity-specific forecasts based on such volatility. The data analytics platform 100 utilizes techniques of both supervised and unsupervised learning as well as one or more instantiations of neural networks to continually enhance the modeling performed in the present invention, by developing and understanding deep relationships between various types of input data 110. The present invention therefore is a robust and comprehensive processing engine for modeling any type of asset whose state or value changes over time and in response to multiple and wide-ranging influences.

The present invention may additionally be contemplated as a framework for analyzing a commodity 102 that includes a plurality of layers for implementing the multi-layer machine learning-based model and representing the data analytics platform 100. These layers include a content acquisition layer, a sentiment and time-series modeling layer, a sentiment classification and training layer, an application layer, a neural network modeling layer, and an output layer, each of which comprises one or more other elements as described further herein.

Figure 1B:
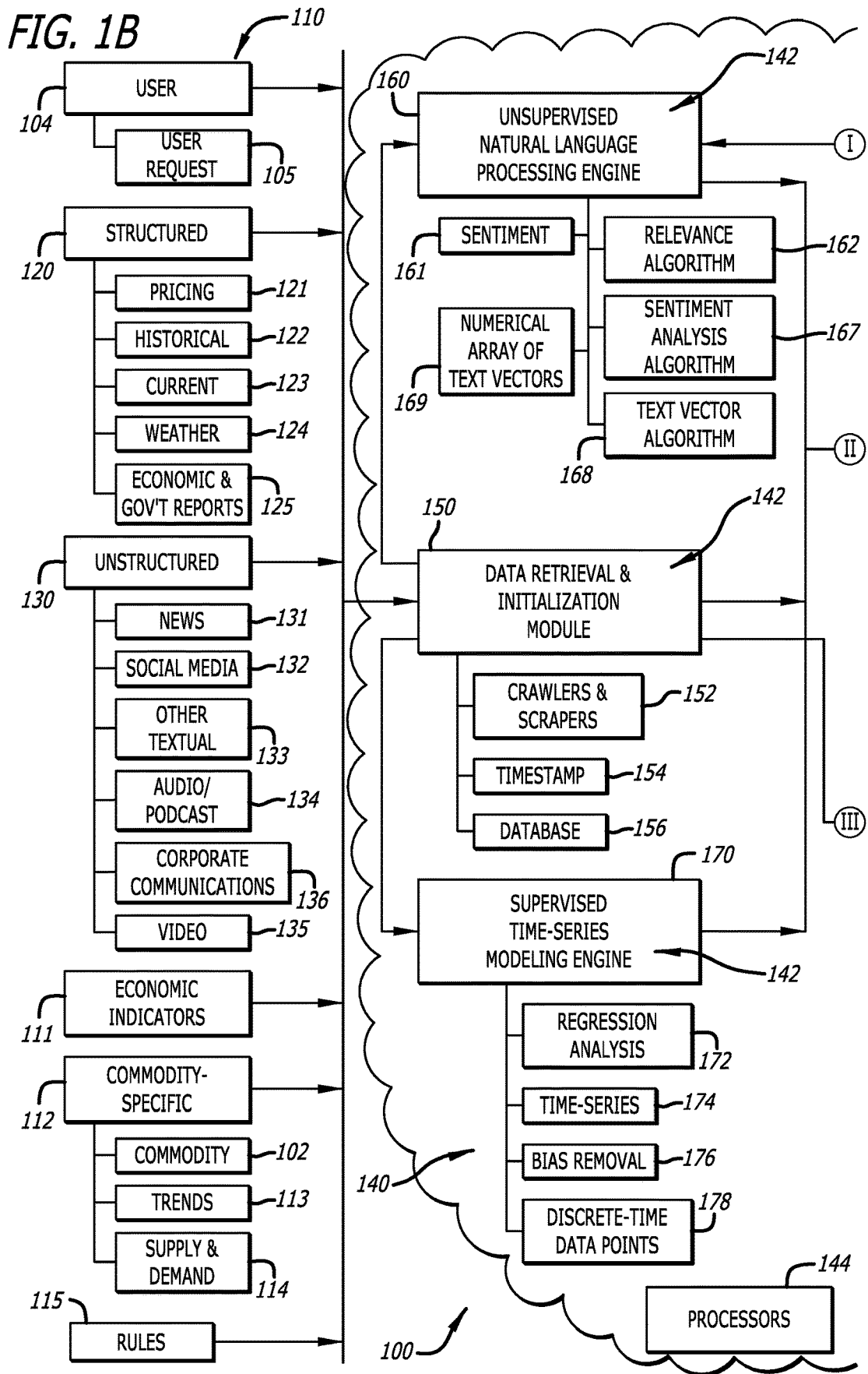
FIG. 1B is a system diagram illustrating elements of different layers of the data analytics platform and according to the embodiment of the present invention shown in FIG. 1A.
Figure 1C:
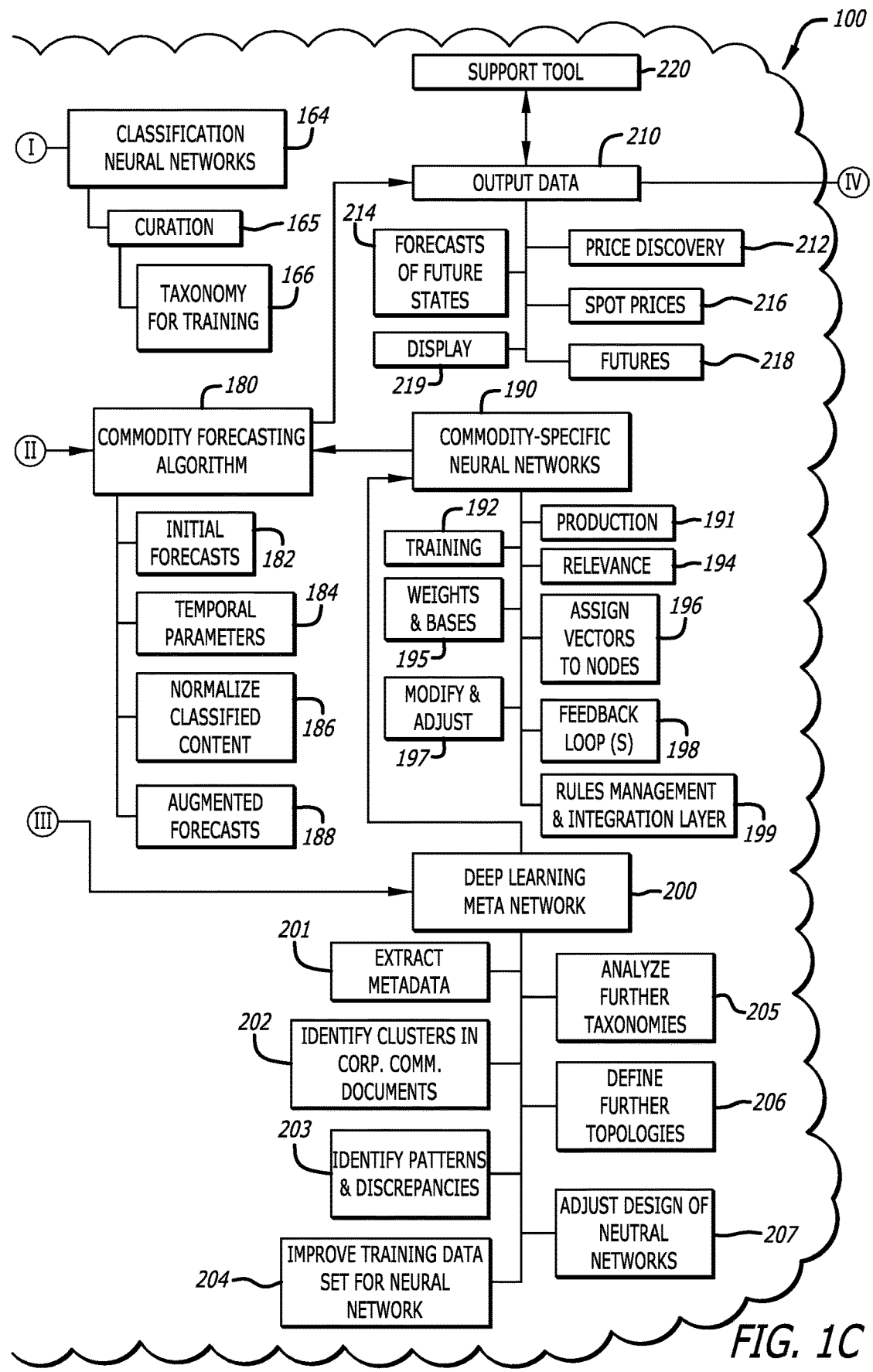
FIG. 1C is a system diagram illustrating elements of further layers of the data analytics platform and according to the embodiment of the present invention shown in FIG. 1A and FIG. 1B.
Figure 1D:
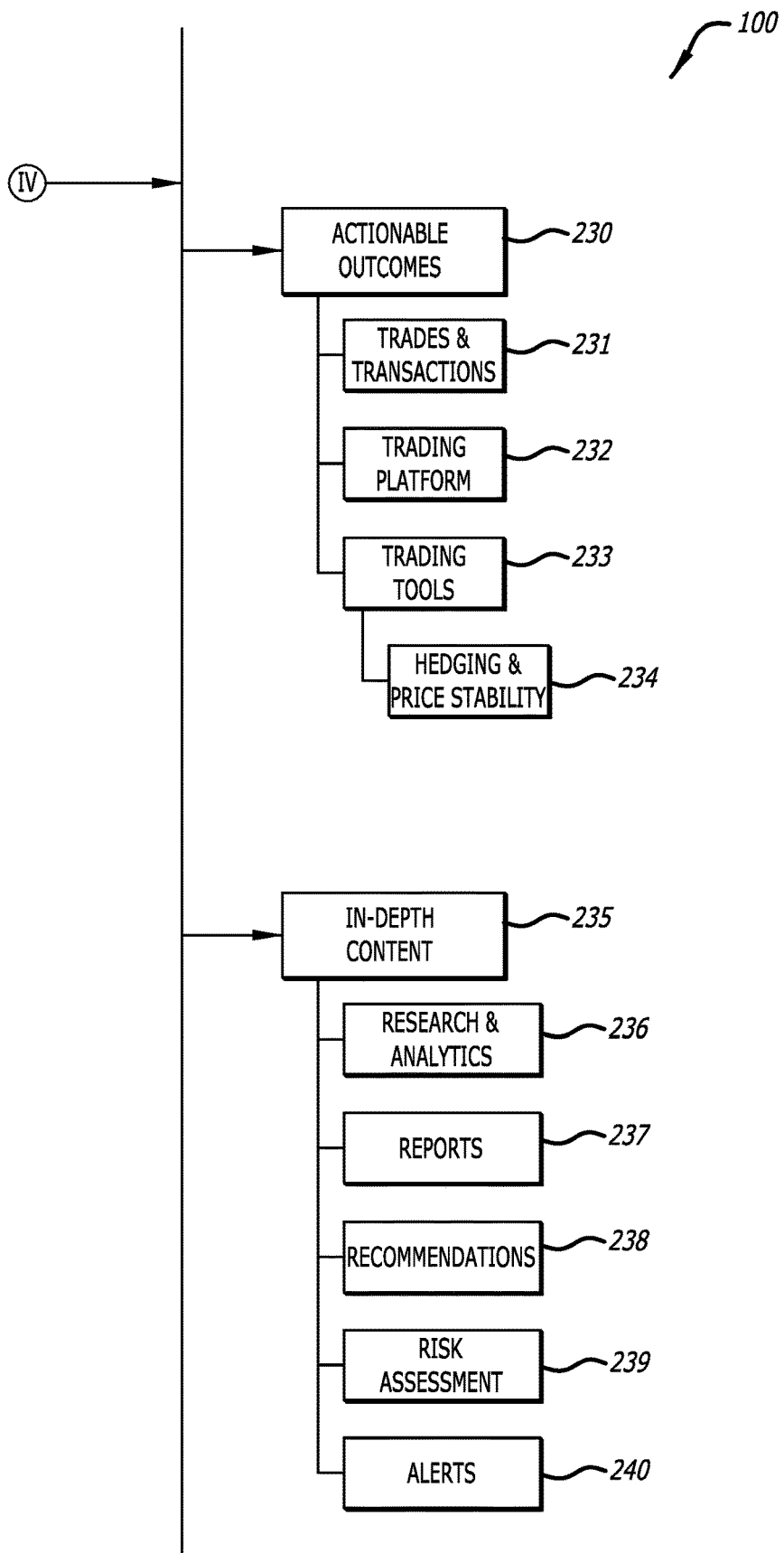
FIG. 1D is a system diagram illustrating elements of an output layer of the data analytics platform and according to the embodiment of the present invention shown in FIG. 1A, FIG. 1B and FIG. 1C.
Figure 2:
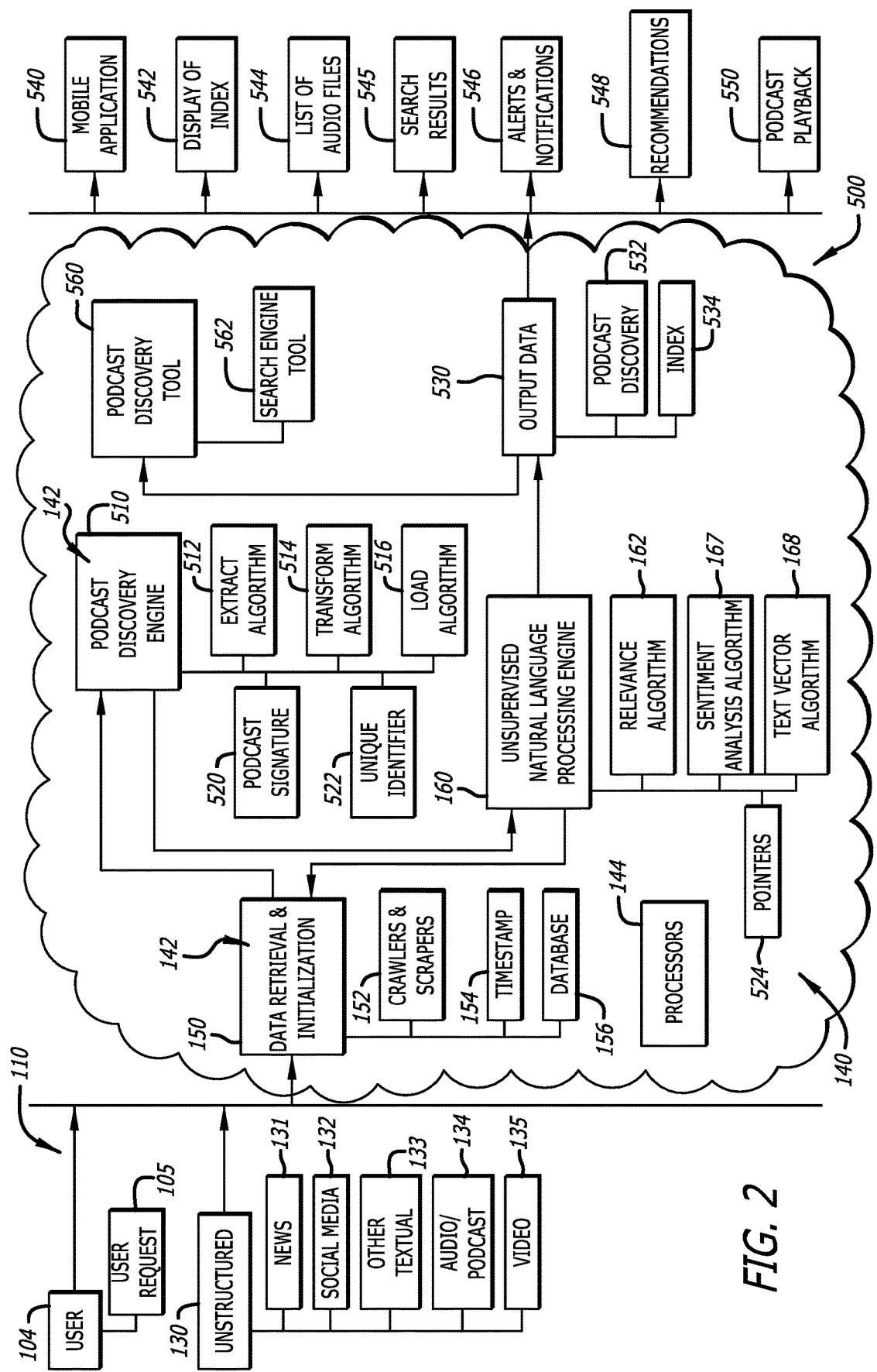
FIG. 2 is a system diagram illustrating elements of an audio file processing and analytics framework as an application of the data analytics platform, according to another embodiment of the present invention.

FIG. 1A is a systemic, high-level block diagram showing various elements comprising the data analytics platform 100 according to one aspect of the present invention. FIGS. 1B-1D illustrate more detail of the systemic, high-level block diagram shown in FIG. 1A. FIG. 1B is a system diagram illustrating elements of layers of the data analytics platform 100, including the content acquisition layer and the sentiment and time-series modeling layer. FIG. 1C is a system diagram illustrating elements of layers of the data analytics platform 100, including the sentiment and classification training layer, the application layer and the neural network modeling layer. FIG. 1D is a system diagram illustrating elements of the output layer of the data analytics platform 100. Together, FIGS. 1A-1D illustrate the elements of the multi-layer machine learning-based model implemented by the data analytics platform 100.

The data analytics platform 100 is embodied within one or more systems and/or methods that are performed in a plurality of data processing modules 130 that are components within a computing environment 140 that also includes one or more processors 142 and a plurality of software and hardware components. The one or more processors 142 and plurality of software and hardware components are configured to execute program instructions or routines to perform the modules, components, and data processing functions described herein, and embodied within the plurality of data processing modules 130.

The data analytics platform 100 analyzes the input data 110 in one or more mathematical processes within a multi-faceted, artificial intelligence-based environment. These processes may include standardized models, and may also include one or more models customized according to proprietary formulas. Regardless, the data analytics platform 100 includes applications of machine learning that enable such mathematical processes to be trained to identify data that is relevant to particular attributes of a commodity sentiment 161 and expressions of sentiment discovery, as well as temporal characteristics within such a commodity sentiment 161, and adjust outcomes accordingly to develop forecasts 212 of volatility and price based on those outcomes. The data processing and analytics platform 100 generates output data 210 that includes, in one embodiment of the present invention, price discovery 214 that is based on those forecasts, such as spot prices 216, futures contract prices 218, as well as other representations and follow-on applications of price discovery 214.

The data analytics platform 100 ingests, receives, requests, or otherwise obtains input data 110 that includes many types of information relative to a relative to a commodity 102 to be analyzed. This input data 110 includes, as noted above, both structured data sources 120 and unstructured data sources 130. Each of these sources include different types of information and are processed differently in the data analytics platform 100 to determine a commodity sentiment 161 and perform sentiment discovery relative to a commodity 102. The commodity 102 to be analyzed, along with a future time for forecasts 212 of a state of the commodity 102 and price discovery 214 at the future time, may be provided by a user request 105 made by a user 104, for example using a support tool 220.

Structured data sources 120 provide information that is either already in processed format, or in an easily processable format. Structured data sources 120 include, but are not limited to, pricing data 121, weather data 124, and economic and government reports 125, as well as image data. Each of these may be provided and analyzed as either historical data 122 or current data 123 (including real-time and near real-time information).

Unstructured data sources 130 provide information that is not already in a format that is processable by one or more mathematical models. Unstructured data sources 130 include, but are not limited to, news reports 131, social media feeds 132, other textual information sources 133, audio files 134 (such as podcasts 134 and other files in an audio format, for example audio books, microblogging feeds in audio format, and audio extracted from other file formats such as video on web-based services or sites such as, for example, YouTube™) and video files 135. Unstructured data sources 130 may also include corporate communications documents 136, such as for example the regular securities-related or debt-related filings that corporate entities are required to file with governmental regulatory agencies, such as the United States Securities Exchange Commission.

Both structured data sources 120 and unstructured data sources 130 may include economic indicator data 111 and commodity-specific data 112. Each of these may represent items of interest such as trends 113 and supply and demand information 114, and may be provided by or reflective of commodity-specific activity for an exchange such as the Chicago Board of Trade or the Chicago Mercantile Exchange, or an index, such as for example the Baltic Dry Index. Economic indicator data 111 includes both leading indicators that reflect change prior to large economic adjustments for predicting future trends and reflect where an economy is heading, and lagging indicators which reflect an economy's historical performance where are only identifiable after an economic trend or pattern has already been established. Examples of economic indicator data 111 include leading indicators such as stock market data (including averages and indices), housing market data such as housing starts and building permits, manufacturing activity, inventory levels, retail sales, transportation and logistics information, and the number of new businesses entering an economy. Examples of lagging indicators include changes in Gross Domestic Product (GDP), inflation data (Consumer Price Index), jobs, wage, and unemployment data, currency strength data, interest rate data, corporate profits, trade balance data, and data for commodities that are traditional alternatives to currencies.

There are many examples of economic and government reports 125 that may be included in structured data sources 120. For example, information generated on a regular or periodic basis in the United States at the local, state, and federal level may be ingested, such as weekly auction reports for different types of cattle, and reports on the prices of commodities such as corn and wheat, as well as for the various types and varieties thereof. In a further example, the United States Department of Agriculture collects and disseminates information for different classes of commodities, such as its Cotton Quality Report.

The structured data sources 120 also include pricing data 121, which as noted above may include both historical data 122 and current or real-time (or near real-time) data 123. It may also include information such as auction results noted above, where such information is provided in a numerical format that is easily ingestible and processable without the need for other analytical functions to convert the information contained therein into numerical form.

Weather data 124 also includes many different types of information. For example, weather data 124 ingested into the data processing and analytics platform 100 may include real-time (current), historical (past), and forecasted or predicted (future) field-level data representative of assessments of weather conditions, either localized to a specific geographical area or for more broadly-defined geographical areas. Such field-level data representative of assessments of weather conditions may be produced by many different sources of meteorological data to provide historical weather data, current field-level weather data, forecasted or predicted weather data (such as information provided in long-range climatological and/or meteorological forecasting from predictive weather models), and observed weather data such as data from both in-situ and remotely-sensed observation platforms. Weather information may also be combined, for example from existing weather prediction models or historical data), with data from weather radar systems and satellites to reconstruct the current or previous weather conditions on any particular area to be analyzed. The present invention may be configured to ingest weather data 124 from many sources, regardless of whether they publicly or privately provided, or internally developed.

Weather data 124 is a useful indicator of commodity prices because weather-related factors may cause significant volatility in commodities markets. There are many examples where such weather-related factors have a profound impact. These may include the presence of cold temperatures during the planting season (roughly mid-April to late-May for most of the corn belt), as that can impact the emergence of the crop from the soil. Weather-related factors may also include overly wet soils from too much rainfall during the planting season, which both impacts the ability to get the crop planted in a timely manner, and damages the seed and/or seedlings, for example if it is also cold while it is wet. Excessive rainfall anytime between the planting period and the middle of the summer may cause nitrogen to be leached away, and may also drown out portions of fields while the plants are still on the smaller side and therefore vulnerable. Conversely, excessive heat, particularly around the time that, for example, a corn crop is tasseling—which is generally anywhere in the last few weeks of July across the corn belt—is dangerous, as heat can partially sterilize the plants—causing some potential seeds on the resulting cobs to be aborted. Excessive dryness, particularly in the months of July and August, is also a potential problem, as dryness during tasseling also leads to pollination problems, and dryness thereafter may hinder the ability of the seeds to 'fill' (i.e. to reach their full size/weight). Further, temperatures at or approaching freezing during the early fall, particularly if temperatures below freezing are at risk of occurring more than a week or two prior to the climatological date of the first frost at any given location, may be damaging, as the hybrids used at any given location are selected for their ability to utilize the full extent of a typical growing season in those climates; if it is shortened by an early frost, that may kill the plants early, and similarly shut down the seed 'filling' process.

Other weather-related volatility includes wet weather conditions after the crop has reached maturity in any given location (usually anywhere from early September to mid-October across the corn belt), as that can make harvest difficult, and can also lead to various types of mold that can limit the usability of the crop. Any significant, early snowfall during harvest (mid-September through mid-November) is also problematic, as the weight of the snow can cause corn stalks to give out and fall over, making the cobs difficult to retrieve during harvest. Still further, any unusually severe wind events during harvest can also lead to concerns, particularly in drought-stressed or nutrient-starved fields, as the stalks are weakened and more prone to breaking over, again making the cobs difficult to retrieve during harvest.

News reports 131 include any textual, audio, or video-based reports that occur in unstructured format, such as news articles. Social media feeds 132 include any textual, audio, or video-based outputs of social media or microblogging platforms, for example Twitter™, Facebook™, LinkedIn™, YouTube™, Instagram™, and any other such platform which is utilized to disseminate information by its users. These outputs are often referred to as "feeds" or "posts" or "tweets" or other such terminology, usually depending on the specific platform used to disseminate content. Other textual information sources 133 include any other sources of unstructured data that must be processed to develop a sentiment 161 therefrom. These may include magazine articles, blog posts, forum comments (or comments to any news article, magazine article, or blog post) and any other digital sources of informational reports or comments.

Audio files 134 include any digital audio file that is made available for playback or download to a computer or mobile device. Podcasts are one example of such audio files 134, which are typically presented as a series, but may include any digital audio file, regardless of temporal presentation characteristics. The present invention contemplates that any type of audio file 134, in any file format, may be ingested and processed in the data analytics platform 100, such as those audio files 134 disseminated as raw audio data, or in a compressed or uncompressed format. Similarly, video files 135 are unstructured data sources 130 in which content is presented as video, and the present invention contemplates that any type of video file, in any video file format, may be ingested and processed in the data analytics platform 100.

Corporate communications documents 136 include any documents prepared and disseminated by private enterprise. These documents 136 are typically prepared as a regulatory requirement, and usually include text, figures, and numbers, and therefore may be either structured or unstructured sources of information. Examples of corporate communications documents 136 include both securities-related regulatory filings and debt-related regulatory filings published by corporate entities, such as those typically (but not necessarily) provided by agencies such as the United States Securities and Exchange Commission.

Still other types of input data 110 include image data, such as that collected by satellite systems, photography or video captured by remotely-piloted vehicles, commonly referred to as drones, or field-based robots configured to generate field-level images, such as those using in-field sensors. Manned and unmanned aerial reconnaissance craft may also be used to acquire image data for processing within the data analytics platform 100 of the present invention. Image data may be processed and utilized, for example, to discern and assess field utilization, and crop and plant growth, health, and any changes thereto over time, that later impact harvesting and production of commodities such as corn and wheat. Image data may be comprised, at least in part, of information in pixels representing different ranges of frequencies along the electromagnetic spectrum, for example where sensors configured with satellite systems include a multi-spectral instrument imaging system that captures and samples data in different spectral bands.

Image data may also include images or pictures visualized on graphical user interfaces, for example as icons, widgets, or other objects presented on a screen that represent a commodity state or a predicted commodity state. The multi-layer machine learning-based model of the data analytics platform 100 may utilize such images as one way of discerning sentiment 161 and sentiment discovery, from trends in financial data or other data (or other graphical representations of sentiment) in financial data presented visually on a graphical user interface.

Input data 110 may also include other information such as data collected from sensors or other devices, whether affixed or coupled to particular objects or positioned in or near particular areas, in an Internet-of-Things environment (or other similar paradigms or approaches having similar names, such as the Internet-of-Farms, Internet-of-Plants, Internet-of-Crops, and Internet-of-Fields, etc.) For example, sensors coupled to agricultural vehicles may collect field and crop data relative to a future commodity state, and transmit that information for collection and processing, which may be ingested into the data analytics platform 100 as input data 110. Other examples include soil sensors, weather sensors, Bluetooth™ components, and other devices which are able to acquire localized information that may be relevant to assessing a future commodity state. Input data 110 may also include data collected from crowdsourcing observations, ground truth data, and other user- or individual-generated information, for example using dedicated applications on smart or mobile computing devices. Input data 110 may further include other types of information related to financial transactions or financial assets, such as fund flows representing cash inflows and outflows for different financial assets at various times.

Commodities, regardless of type, are essential factors in the production of other goods, and are important elements of economic activity. Commodities are traded constantly on exchanges around the world, such as for example the Chicago Mercantile Exchange, The London Metals Exchange, and the Intercontinental Exchange. On these exchanges, commodities are typically traded via futures contracts, which obligate the holder to buy or sell a commodity at a predetermined price on a delivery date in the future. The market price of a commodity is often the market futures price for that respective commodity. The futures price is different from the spot price or cash price, which is the actual price of the commodity that one would pay for that commodity on the day the spot price is given. The spot price is a fixed price for the commodity, while the futures price can be more or less than the spot price at any given moment.

Futures are derivative contracts that generally allow hedgers and speculators to trade the price of an asset that will settle for delivery at a future date in the present, and are standardized and traded on regulated exchanges. Futures derive value from an underlying asset such as a traditional stock, a bond or stock index, or a commodity, and are agreements between two parties to buy or sell something at a future date for a certain future price. The party who agrees to buy is "long" and the party agreeing to sell is "short."

Futures enable price discovery in financial markets, as they rely on a continuous flow of information and transparency. Price discovery is the overall process of setting the spot price or the proper price of an asset, security, commodity, or currency. The process of price discovery looks at a number of tangible and intangible factors, including supply and demand, the overall economic and geopolitical environment, and risk characteristics. As noted above and below, a tremendous amount of information is available to understand these tangible and intangible factors, and price discovery may be reflected in sentiment that is often expressed in therein.

Many such factors impact the supply and demand of an asset and thus its future and spot prices. This kind of information is reflected in future prices; future prices for contracts nearing maturity tend to converge to the spot price, and thus, the future price of such contracts serve as a proxy for the price of the underlying asset, and an indicator of market expectation. Therefore, tools for evaluating price discovery, and predicting and forecasting spot prices in the future based on price discovery, are very helpful to traders, investors, and other interested parties.

The present invention is, as noted above, a data analytics platform 100 that is provided in one or more systems and methods for, in one aspect thereof, utility in the process of price discovery, and in modeling commodity volatility and price over time. The data analytics platform 100 is embodied in one or more systems and methods that use this price discovery and modeling for forecasting future commodity prices, using multiple and disparate information from many different sources.

It is to be understood that the plurality of data processing modules 142 are also shown in FIGS. 1A-1D, where applicable, by their specific, respective reference numerals as indicated below. It is to be further understood that these modules are components of the larger computing environment 140, and constitute one or more structures, hardware, firmware, or software such as algorithms, routines, subroutines, and the like, that are specifically configured to execute particular functions within the data analytics platform 100. It is to be additionally understood that the data processing modules 142, and the respective elements of the present invention that together that comprise these specifically-configured components, may interchangeably be referred to as "components," "modules," "algorithms" (where appropriate), "engines," "networks," and any other similar term that is intended to indicate an element for carrying out a specific data processing function.

The data processing modules 142 include, as noted above, a data retrieval and initialization module 150, which is configured to ingest, receive, request, or otherwise obtain input data 110, whether it be in relation to structured data sources 120 or unstructured data sources 130, or any other type of input data 110. This data retrieval and initialization module 150 may also be configured to parse and initialize data for the other data processing modules 142, and may also be configured pre-condition or pre-format raw input data 110 where appropriate, so as to be prepared for the natural language processing engine 160, the time-series analysis engine 170, the commodity forecasting algorithm 180, the one or more commodity-specific neural networks 190, and the one or more deep-learning meta networks 200 that are additional processing aspects of the data analytics platform 100.

The data retrieval and initialization module 150 may include one or more crawlers and scrapers 152 that are algorithms configured to search for and extract information within both structured data sources 120 and unstructured data sources 130. The data retrieval and initialization module 150 may be further configured to assign a timestamp 154 to input data 110 that is collected by crawlers and scrapers 154, and store information in a database 156. Crawlers and scrapers 154 may include, but are not limited to, algorithms that perform transcription services, translation services, image processing services, etc.

Natural Language Processing

The data retrieval and initialization module 150 parses the unstructured data sources 130 and provides this information to the natural language processing engine 160, which is configured to develop a commodity sentiment 161 for the specific commodity 102 being analyzed, perform sentiment discovery as to the commodity 102, and provide a sentiment analysis of that commodity 102 to the commodity forecasting algorithm 180, represented as a numerical array of text-based numerical vectors.

The natural language processing engine 160 of the data analytics platform 100 is an unsupervised instantiation of machine learning, in which one or more data processing functions are applied to the unstructured data sources 130 to perform sentiment discovery and develop the commodity sentiment 161. This is accomplished by first performing a relevance algorithm 162, which is configured to identify a relevance for each piece of textual information provided by the data retrieval and initialization module 150 (and/or in the database 156). This relevance is defined separately for each commodity 102. Each item or document containing such textual information that is analyzed may be considered relevant to one or more commodities 102, or irrelevant to one or more commodities 102.

The relevance algorithm 162 of the natural language processing engine 160 determines if textual content in the unstructured data sources 130 belongs to a certain category that correlates to sentiment attributes of a particular commodity 102, so as to identify and extract natural language keywords, and further identify keyword pairings. The relevance algorithm 162 is, prior to its application, trained and optimized for accuracy to ensure that the keywords and keyword pairings are appropriate for the commodity 102 being analyzed and the sentiment attributes thereof. Training of the relevance algorithm 162 is based on a set of training documents, and optimization of the relevance algorithm 162 is based on a set of testing documents. Each document in the training set is attributed to the certain category, either manually or automatically, and many machine-learning techniques for utilizing the training set to train the relevance algorithm may be used, including for example random forest, stochastic gradient, decision tree, naïve Bayes, boosting-based neural network (such as AdaBoost), and combinations thereof.

The testing set of documents for optimization of the relevance algorithm 162 for accuracy thereof includes documents that were not used in the training set. Each document in this testing set is also attributed to the particular commodity 102 for which the relevance algorithm 162 is to be applied. The trained relevance algorithm 162 is applied to the testing set, and both a percentage of false negatives and a percentage of false positives are calculated. A total error percentage is a sum of these two percentages. The natural language processing engine 160 then varies algorithmic parameters, and retrains for each set of parameters; the retrained algorithm is again applied to the testing set, and a revised total error percentage is calculated. This optimization process produces a set of algorithm parameters that delivers the least error percentage.

The relevance algorithm 162 may be trained and optimized for each particular, selected commodity 102 separately, since textual content in the unstructured data sources 130 can belong to multiple categories. This is enhanced within the data analytics platform 100 by determining whether textual content belongs to a certain category in a process that involves developing a taxonomy 166 of textual relevance, in an application of a classification and training neural network 164 for training the natural language processing engine 160. The classification and training neural network 164 includes a human curation 165 that is used to create, at least in part, this taxonomy 166 of textual relevance for each particular commodity 102. This taxonomy 166 is combined with the identified keywords and pairings thereof, together with keyword frequencies calculated as noted below, to enhance the overall output generated by the natural language processing engine 160.

The relevance algorithm 162 also calculates a probability that the textual content belongs to a certain category. For example, where the probability is greater than 0.5, the text is considered relevant to the category, and the natural processing engine 160 proceeds with the sentiment analysis algorithm 167.

The natural language processing engine 160 may also be configured to perform one or more algorithms that remove unnecessary or 'stop' words from textual content in each document among the unstructured data sources 130. Stop words are words that make little to no sense in the relevancy of a document, such as for example "like," "the," "a," "is," "do," and other similar words.

Sentiment Analysis

The natural language processing engine 160 applies an output of the relevance algorithm to a sentiment analysis algorithm 167, to perform sentiment discovery and attribute a sentiment 161 to the document or information for each item of the unstructured data sources 130. The sentiment analysis algorithm 167 of the natural language processing engine 160 identifies whether keywords are mentioned in a positive manner or in a negative manner in textual content, in relation to one or more sentiment indicators. For example, if a particular commodity 102 is mentioned in a positive manner, it may suggest that the author of the text anticipates that volatility of the commodity 102 is trending long, meaning that a price increase in the future is more likely than not. Similarly, if a particular commodity 102 is mentioned in a negative manner, it may suggest that the author of the text anticipates that volatility of the commodity 102 is trending short, meaning that a price decrease in the future is more likely than a price increase.

The sentiment analysis algorithm 167 utilizes the curated list of keywords identified above that is specific to the commodity 102 being analyzed. When one of these keywords is found in a text, the sentiment analysis algorithm 167 applies a proximity analysis to search for a sentiment indicator that suggests a positive or negative treatment, within the proximity of the keyword location. For example, the sentiment analysis algorithm 167 may search within a proximity radius of five words relative to the keyword. The sentiment analysis algorithm 167 drops keywords where there is no sentiment indicator located within the specified proximity.

A sentiment indicator is a word or expression, taken from a list of such sentiment indicators. This list of sentiment indicators is a curated collection of words or expressions that is constructed for a specific commodity 102, and in some cases for specific keywords themselves. For example, if a keyword is "price" and a sentiment indicator is "increasing," then it can be classified with a positive sentiment 161. If the keyword is "cost" however, then the same sentiment indicator would suggest a negative sentiment 161, and be classified accordingly. After a keyword and sentiment indicator have been found in a text, the sentiment analysis algorithm 167 applies the proximity analysis again to search for an inversion. For example, "bad" is a negative sentiment indicator, while "not bad" is a positive indicator.

After all keywords and sentiments in the text have been identified, the sentiment analysis algorithm 167 sums all positive and all negative sentiment occurrences. Since keywords can occur in different grammatical forms, the sentiment analysis algorithm 167 matches them by their lemmas, which is a particular form of the keyword that is chosen to represent the lexeme, or common grouping of the same words yet appearing in those different grammatical forms. Each keyword is converted to its lemma, and two keywords are considered identical if they have an identical lemma. The sentiment analysis algorithm 167 then calculates statistics for each keyword lemma. When processing a set of several textual documents, the sentiment analysis algorithm 167 is capable of calculating sentiment statistics for the entire set per each keyword.

The sentiment analysis algorithm 167 generates, as an output, a list of keywords with positive and negative counts, together with a list of sentences where the sentiments have been identified in the text. For a set of documents, the sentiment analysis algorithm 167 calculates positive and negative percentages for each keyword. The natural language processing engine 160 then provides this information to a text vectorization algorithm 168.

Text Vectorization

Once textual content in the unstructured data sources 130 has been identified as having a relevancy to a particular commodity 102 being analyzed, and a commodity sentiment 161 determined for each document in the unstructured data sources 130, the natural language processing engine 160 converts the textual content into an array of numbers 169 using a text vectorization algorithm 168. These arrays of numbers 169 are used as inputs to the commodity forecasting algorithm 180.

The text vectorization algorithm 168 of the natural language processing engine 160 converts raw text into a numeric representation for the array of numbers 169, using Term Frequency-Inverse Document Frequency (TFIDF) method. The text vectorization algorithm 168 determines a keyword frequency by calculating the number of occurrences for each keyword, as well as occurrences of keyword pairings (such as bigrams, trigrams, n-grams, etc.) for each document, and applies the TFIDF method to adjust the frequencies by multiplying by a coefficient that is derived from a percentage of documents in which each keyword is present.

Once keywords and their pairings are identified and stop words have been filtered out, and the TFIDF method is applied to adjust the keyword frequencies. Each term in each document among the unstructured data sources 130 has a number associated number with it between 0 and 1. The natural language processing engine 160 may limit the combined number of terms across all relevant documents in the set identified for the particular commodity 102 to a large number, for example 10000 terms, for ease of processing. The text vectorization algorithm 168 then generates a vector of term numbers for each document in the set of identified documents, and compiles the numerical array 169 representing the vectors of term numbers. This information is stored in the database 156 for further processing in the multi-layer machine learning-based model.

Time-Series Modeling Engine

The data retrieval and initialization module 150 also parses the structured data sources 120, and provides this information to the time-series modeling engine 170, which is configured to develop a series of discrete-time data points 178 for the specific commodity 102 being analyzed by performing a regression analysis 172 on the structured data sources 120. The outcome of the regression analysis 172 provides a time-series 174 analysis of that commodity 102, which generates the discrete-time data points 178 sent to the commodity forecasting algorithm 180 for further processing.

The time-series modeling engine 170 is a supervised instantiation of machine learning, in which one or more data processing functions are applied to structured data sources 120 to develop the series of discrete-time data points 178 representing a deconstructed analysis of the commodity state over a prior period of time represented in the structured data sources 120. This is accomplished by performing a regression analysis 172 on both historical 122 and current 123 (real-time, or near real-time pricing data 121, and using weather data 124 and other numerical data contained in economic and government reports 125, where necessary, to provide a temporally-relevant explanation for the observations in the structured data sources 120.

The time-series modeling engine 170 is also configured to remove bias 176 from the structured data sources 120. Bias is removed from the structured data sources 120 to improve the follow-on regression analysis 172, for example by identifying and removing a seasonal periodicity that may cause fluctuations in pricing data 121. Bias removal 176 identifies and removes data points in both the commodity's historical performance as well as in the current pricing data 123, to account for variances in the observations therein.

The time-series modeling engine 170 converts information in those structured data sources 120 into a time-series 174 that reflects the temporally-relevant explanation of the information therein to understand how events affect commodity values over time. The time-series 174 analysis is a statistical process that imparts a temporal dimension to observations that comprise the data being processed. Many statistical analyses may be performed on pricing data 121 to arrive at a time-series 174, such as for example the regression analysis 172 as noted above, that allow for an assessment of the commodity's past performance over time. The present invention contemplates that any type of machine learning statistical analysis may be performed, including but not limited to different types of regression analyses and logistic functions, decision trees, random forest classifiers, support vector machines, and probit, and that any such statistical analysis is within the scope of the present invention. It is to be further understood that the present invention and the present specification are not to be limited to any one specific example of a time-series analysis discussed or referenced herein.

The time-series modeling engine 170 quantifies observations in the structured data sources 120 to permit inferences to be drawn from past performance reflected in the historical pricing data 121, and to extrapolate data points that permit an application to temporally similar simulations of future outcomes. The discrete-time data points generated in the mathematical functions performed in the time-series modeling engine 170 represent, in a sense, a further commodity sentiment based on these inferences. The discrete-time data points 178 are provided to the commodity forecasting algorithm 180 for further processing to generate the output data 220.

Commodity Forecasting Algorithm

The data analytics platform 100 provides outputs of the natural language processing engine 160 and the time-series modeling engine 170 to the commodity forecasting algorithm 180 as noted above, which models initial forecasts 182 of commodity states represented in output data 210. These outputs are augmented by identifying relationships in the combined sentiment (represented as the numerical array 169 and discrete-time data points 178) to generate the initial forecasts 182 over time of the commodity state(s) for the commodity 102 being analyzed.

The commodity forecasting algorithm 180 identifies temporal parameters 184 for the commodity state(s), and normalizes 186 the incoming information from processed structured data sources 120 and unstructured data sources 130 based on those temporal parameters 184 so that assessments of the commodity state(s) are made with greater accuracy. These assessments are performed in conjunction with one or more commodity-specific neural networks 190 and one or more deep learning meta networks 200 as described further below, which inform and enable the development of comprehensive forecasts within the commodity forecasting algorithm 180.

The commodity forecasting algorithm 180 is configured to generate information that as noted above includes many types of indicators of price discovery 212 representing a commodity state at some specified future time. For example, in one aspect of the present invention, the commodity forecasting algorithm 180 generates forecasts 214 representing commodity spot prices 216 for a certain number of weeks (for example, 30) into the future. Where spot prices 216 are the price discovery 212, the commodity forecasting algorithm 180 forecasts 214 the spot price 216 for a commodity 102, representing for example the Friday closing for each week.

The commodity forecasting algorithm 180 is capable of forecasting spot prices 216 starting from a current date, or from a date in the past, and therefore one temporal parameter 184 is a starting date. The starting date for the analysis performed by the commodity forecasting algorithm 180 may be set by a user 104, or may be automatically determined based on temporal indicators in the structured data sources 120, the unstructured data sources 130, or both. Regardless, the capability to set the starting date to one in the past helps with training, testing, and validation of the commodity forecasting algorithm 180. The start date for the forecasting capability may be set to any date in the past within a certain range, comprising several years, and is constrained by the availability of historic data for the commodity 102 being forecasted; therefore, the addition of more historic data, or older historic data, to the structured data sources 120 changes the capability of the commodity forecasting algorithm 180 to model past data, and also improves the training, testing, and validation aspects thereof.

Once the starting date has been determined, the commodity forecasting algorithm 180 identifies a window of analysis as another temporal parameter 184. The duration of the window of analysis is typically several weeks, for example 4 weeks. The commodity forecasting algorithm 180 assumes that news, events and price movements within the window of analysis influence the resulting forecast, while any information prior to the beginning of the window of analysis has been already priced in, and has no additional value for forecasting future commodity states. The duration parameter value may be varied during training of the commodity forecasting algorithm 180 in order to optimize accuracy of resultant commodity state forecast(s). A further temporal parameter 184 representing an end date for a forecast 214 of the commodity state(s) at the specified future time may also be identified.

After the temporal parameters 184 representing the starting date, the window of analysis, and the end date have been identified, the data analytics platform 100 requests processed input data 110 from all relevant structured data sources 120 and unstructured data sources 130 that are timestamped within a date that is within the window of analysis. In the case of textual inputs in unstructured data sources 130, for each textual input in the unstructured data sources 130, the data analytics platform 100 also determines if the input belongs to a category related to the commodity 102 being forecasted from the text extracted from each source item, and therefore only related input in the input data 110 is used by the commodity forecasting algorithm 180. This category information may be represented by one or more pointers that enable retrieval of relevant pieces of unstructured data sources 130 from the database 156. Where the inputs are from structured data sources 120, category information has been pre-identified based at least on the source of such structured data 120, and pointers to such data sources 120 are also stored within the database 156 for quick retrieval by category.

The commodity forecasting algorithm 180 normalizes relevant information in structured data sources 120 and unstructured data sources 130, as noted above, by identifying those timestamps that associate the numerical array 169 of text-based numerical vectors with the sequence of discrete time data points 178, based on one or more variables that reflect the state of the commodity 102. These variables may be correlated to the temporal parameters 184 referenced above, to categories referenced in the unstructured data sources 130 for which a temporal relationship can be identified, or to other variables identified that have a sentiment influence on the commodity state indicated in the structured data sources 120 and the unstructured data sources 130 and for which a temporal relationship can be identified. In other words, the commodity forecasting algorithm 180 attempts to correlate the two sets of outputs by identifying temporally-relevant variables independent of each other across each of the two data sources 120 and 130 processed, that have some sentiment influence on the commodity state, and relating occurrences of those independent variables in the numerical array 169, with the discrete-time data points 178 relative to those variables. This enables creation of a set of normalized, classified content 186 for the selected commodity 102 that relate the sentiment influence on the commodity state across both outputs from the natural language processing engine 160 and the time-series modeling engine 170.

The temporal parameters 184 enable application of the normalization classified content 186 representing the structured data sources 120 and the unstructured data sources 130, so that sentiment 161 in that input data 110 is related along the common starting date and duration of window of analysis. The information in the structured data sources 120 and unstructured data sources 130 are therefore equated by both common subject matter and common temporal characteristics, so that for the data for the same commodity 102 and for the same temporal parameters 184 are synthesized. This enables the one or more commodity-specific neural networks 190 to help the commodity forecasting algorithm 180 generate the initial forecast 182.

Neural Networks in Multi-Layer Machine Learning-Based Model

In the multi-layer machine learning-based model, the commodity forecasting algorithm 180 is coupled to a neural network modeling layer that is comprised, for each commodity 102, of one or more neural networks 190, and one or more deep learning meta networks 200. This neural network modeling layer is included to further evaluate the structured data sources 120 and the unstructured data sources 130 to increase accuracy in the forecasts 214 of future commodity states, as discussed further below, by incorporating instantiations of neural networks that are tuned to adjust 197 the initial forecasts 182 generated by the commodity forecasting algorithm 180 and produce augmented forecasts 188 that improve the accuracy of the output data 210.

Neural networks generally are comprised of nodes, which are computational units having one or more biased input/output connections, which are transfer (or activation) functions that combine the inputs in some way, and an output connection. Nodes are then organized into layers that form a neural network.

The one or more commodity-specific neural networks 190 are configured to examine and improve the outcomes of the commodity forecasting algorithm 180, and may include instantiations of different networks for different purposes. The present invention contemplates both a production neural network(s) 191, configured to refine the commodity forecasting algorithm 180 to generate output data 210, and a training neural network(s) 192, configured to train the production network(s) 191 using improvements on the reasons for prior, historical outcomes of forecasts for particular commodities that have been learned within the neural network modeling layer. The deep learning meta networks 200, described further below, are a further layer of artificial intelligence in the present invention that includes elements of both supervised and unsupervised machine learning that, at least in part, further improve upon the development of the one or more commodity-specific neural networks 190.

The production network(s) 191 of the one or more commodity-specific neural networks 190 are configured to modify and adjust 197 the initial forecasts 182 from the commodity forecasting algorithm 180 that were made using numerical arrays 169 representing processed text vectors generated by the natural language processing engine 160 and the discrete-time data points 178 generated by the time-series modeling engine 170. This modifying/adjusting function 197 is performed by determining a further relevance 194 of the text vectors. The relevance 194 is continuously evaluated by examining each member of each taxonomy (comprised of commodity-specific indicators such as keywords, frequencies thereof, and/or distance between keywords)—for a pricing aspect of the commodity 102 being evaluated, and using a refinement of the commodity-specific indicators having an influence on sentiment for the particular commodity 102 being analyzed. In addition, taxonomy is continuously refined and applied as a training set for the training neural network(s) 192.

The data analytics platform 100 uses the relevance 194 of the text vectors to calculate weights and biases 195 for the mathematical functions used to process inputs of the production neural network(s) 191 that are described further below, and assign text vectors 196 to each node thereof. The weights and biases 195 are also assigned within the various layers (or, nodes and connections) of the one or more neural networks 190, and adjusted as the inputs for each commodity 102 are processed, and as further taxonomy members are identified and modified for each commodity 102 whose future state is being forecasted.

The neural network modeling layer therefore uses the commodity-specific indicators for each taxonomy (keywords, frequencies of their occurrence and distance relationships between them), to construct the nodes and connections of the production neural networks 191. Each textual vector corresponds to an assigned keyword, frequency, or distance relationship, and each node and connection is designed to model a particular aspect of the commodity 102. This is further accomplished by inferring relationships between taxonomy members, assigning text vectors to relevant taxonomy members based on the inferred relationships, and constructing the production neural network 191 using mathematical relationships designed to arrive at desired outcomes as indicated by the training neural networks 192.

The one or more commodity-specific neural networks 190 also incorporate a time delay, or feedback loop 198, which is calculated to account for temporal dependencies that help to explain sentiment expressed in the representative text vector based on the taxonomy members in relation to price movements over time, and to further improve the results of the commodity forecasting algorithm 180. As noted in more detail below, this may be performed by a particular type of neural network that accounts for timed data sequences, such as for example a Long-Short-Term-Memory (LSTM) neural network. Feedback loops 198 and other time delay mechanisms applied by the various mathematical functions of such a neural network are modeled after one or more temporally-relevant characteristics derived from the relevance 194, and incorporating the calculated weights and biases 195. The data analytics platform 100 applies these elements of neural network design to adjust 197 the commodity forecasting algorithm 180 to generate the augmented forecasts 188.

Supervised learning is an application of mathematical functions in algorithms that classify input data 110 to find specific relationships or structure therein that allow the data analytics platform 100 to efficiently produce highly accurate output data 210. There are many types of such algorithms for performing mathematical functions in supervised learning approaches. These include regression analysis (including logistic regression, polynomial regression, and many others), decision trees, Bayesian approaches such as naive Bayes, support vector machines, random forests, anomaly detection, etc.

Neural networks are also a type of such supervised learning approaches, which may also include one or more of the computational techniques in the algorithms described above within their structures. Neural networks are more flexible than regression approaches, and allow for combinations of both structured data (e.g., regular price updates) and unstructured data (e.g., news articles, tweets, podcasts) as inputs to produce the types of outputs desired in the data analytics platform 100.

There are many types of neural networks, which are computing systems that "learn" to perform tasks without being programmed with task-specific rules, based on examples. Neural networks generally are based on arrays of connected, aggregated nodes (or, "neurons") which are computational units that transmit signals to each other in multiple layers over connections. Connections are activation or transfer functions that "fire" these nodes and combine inputs according to mathematical equations or formulas. Different types of neural networks generally have different configurations of these layers of connected, aggregated nodes, but they can generally be described as an input layer, a middle or 'hidden' layer, and an output layer. These layers may perform different transformations on their various inputs, using different mathematical calculations or functions. Signals travel between these layers, from the input layer to the output layer via the middle layer, and may traverse layers, and nodes, multiple times.

Signals are transmitted between nodes over connections, and the output of each node is calculated in a non-linear function that sums all of the inputs to that node. Weight matrices and biases are typically applied to each node, and each connection, and these weights and biases are adjusted as the neural network processes inputs and transmits them across the nodes and connections. These weights represent increases or decreases in the strength of a signal at a particular connection. Additionally, nodes may have a threshold, such that a signal is sent only if the aggregated output at that node crosses that threshold. Weights generally represent how long an activation function takes, while biases represent when, in time, such a function starts; together, they help gradients minimize over time. At least in the case of weights, they can be initialized and change (i.e. decay) over time, as a system learns what weights should be, and how they should be adjusted. In other words, neural networks evolve as they learn, and the mathematical formulas and functions that comprise neural networks design can change over time as a system improves itself.

Recurrent neural networks are a name given to types of neural networks in which connections between nodes follow a directed temporal sequence, allowing the neural network to model temporal dynamic behavior and process sequences of inputs of variable length. These types of neural networks are deployed where there is a need for recognizing, and/or acting on, such sequences. As with neural networks generally, there are many types of recurrent neural networks.

Neural networks having a recurrent architecture may also have stored, or controlled, internal states which permit storage under direct control of the neural network, making them more suitable for inputs having a temporal nature. This storage may be in the form of connections or gates which act as time delays or feedback loops that permit a node or connection to retain data that is prior in time for modeling such temporal dynamic behavior. Such controlled internal states are referred to as gated states or gated memory, and are part of long short-term memory networks (LSTMs) and gated recurrent units (GRUs), which are names of different types of recurrent neural network architectures. This type of neural network design is utilized where desired outputs of a system, such as the data analytics platform 100, are motivated by the need for memory, as storage, and as noted above, where the system is designed for processing inputs that are comprised of timed data sequences. Examples of such timed data sequences include video, speech recognition, and handwriting—where processing requires an analysis of data that changes temporally. In the present invention, where output data 220 is in the form of forecasted states, or prices, of commodities at some future, an understanding of the influence of various events and sentiment on a state over a period of time lead to more highly accurate and reliable forecasts.

Many other types of recurrent neural networks exist. These include, for example, fully recurrent neural networks, Hopfield networks, bi-directional associative memory networks, echo state networks, neural Turing machines, and many others, all of which exhibit the ability to model temporal dynamic behavior. Any instantiation of such neural networks in the present invention may include one or more of these types, and it is to be understood that the one or more commodity-specific neural networks 190 may include different ones of such types. Therefore, the present invention contemplates that many types of neural networks may be implemented depending on the specific commodity being analyzed and/or on the text vectors provided by the natural language processing engine 160, and/or on the taxonomy (ies) generated by the deep learning meta networks 200 as described further below.

As noted above, the one or more commodity-specific neural networks 190 are configured to improve upon the commodity forecasting algorithm 180. Where data sequences being analyzed—or, the time over which forecasts are being generated—have a long time dependency, the effect of a given input on the middle or hidden layer (and consequently the output) of a neural network may either saturate or exponentially decay as a function of time (or, sequence length). This is due to latency in processing which causes the neural network to suffer from insensitivity to inputs characterized by longer (in time) data sequences. The one or more commodity-specific neural networks 190 may include at least one specific neural network to address this issue, and further improve upon the commodity state forecasts of the commodity forecasting algorithm 180.

Neural networks may be configured to address the problem of decay in longer time-dependent sequences in an architecture that has multiple, interactive components acting as "blocks" in place of the conventional layers of the neural network. Each of these blocks may represent a single layer in that middle layer, or may form multiple layers; regardless, each block may be thought of as representing different timesteps in a time-dependent sequence analysis of input data.

The components of such a specially-focused neural network form its internal state and include a cell, which acts as the memory portion of the block, and three regulating gates that control the flow of information inside each block: an input gate, an output gate, and a forget gate. The cell remembers values over arbitrary time intervals, by keeping track of the dependencies between elements in an input sequence, and the three gates regulate the flow of information into and out of the cell. The input gate controls the extent to which a new value flows into the cell, the forget gate controls the extent to which a value remains in the cell, and the output gate controls the extent to which the value in the cell is used to compute the output of the block. The decision-making function of these gates is often referred to as the logistic sigmoid function for computing outputs of gates in these types of neural networks. There are connections into and out of these gates, and at least the weights of these connections, which need to be learned during training, determine how the gates operate.

Inside neural network blocks, there are additional layers that perform the activation functions needed to ensure that time-dependent data sequences are properly analyzed to avoid decay. One such activation function that may be incorporated is a tanh layer, which effectively classifies input data by determining which input values are added to the internal state of the block. Input gates are a layer of sigmoid-activated nodes whose output is multiplied by inputs classified by preceding tanh layers. The effect of these activation functions is to filter any elements of the input vectors that are not required, based on the text vectors assigned to each node for the commodity being analyzed, and the weights and biases applied. The weights applied to connections between these nodes can be trained to output values close to zero to switch off certain input values (or, conversely, to pass through other values). Another internal state of a block, the forget gate, is effectively a feedback loop that operates to create a layer of recurrence that further reduces the risk of decay in time-dependent input data. The forget gate helps the neural network learn which state variables should be "remembered" or "forgotten". The internal states of the neural network operate to model the time series-based data forecasts generated by the commodity forecasting algorithm 180 using the text vectors of the natural language processing engine, and weights and biases applied thereto.

Rules-Based Machine Learning and Explainable Artificial Intelligence

The multi-layer machine learning-based model in the data analytics platform 100 may also include applications of knowledge-based artificial intelligence, in which rules 115 are applied to the one or more commodity-specific neural networks 190. In such a rules-based machine learning application of symbolic artificial intelligence, mathematical inputs representing human knowledge and behavioral rules, for example those based on economic and government reports 125, are developed and explicitly embedded into the algorithms performed within the multi-layer machine learning-based model. Where such human knowledge and behavioral rules are applied as input data 110, the present invention may be considered as a combination of neural network technology and "explainable" artificial intelligence, where the human knowledge and behavioral rules influence the development of mathematical formulas, equations, and models represented throughout the elements of the one or more commodity-specific neural networks 190, for example as additional weights and biases 195 applied in any layer thereof.

This represents a neuro-symbolic integration of different forms of machine learning within the data analytics platform 100, where rules-based inputs are integrated with the one or more commodity-specific neural networks 190 so that human knowledge and behavioral rules influence the inputs, nodes and connections thereof, such as the "knobs" applied to tune neural networks, where applicable for the particular commodity 102 being modeled. Such a neuro-symbolic integration improves the performance of traditional neural networks by introducing constraints based on rules 115 that are relative to expected trends in a commodity state. This increases the quality and accuracy in modeling outcomes, at least by providing explainability, reducing training dataset size, and producing greater confidence in sentiment discovery, price discovery, and forecasted future commodity states.

While neural networks typically acquire expert knowledge about a domain representing a particular problem during the training process, this knowledge is dispersed throughout the layers of the network architecture and connection weights and biases, and not directly accessible for re-application. Having the ability to express this knowledge in a structured form, as an extra layer applied within the network architecture and with known characteristics guiding its placement, has the ability to greatly improve performance. Neuro-symbolic integration therefore provides a means for guiding connectionist machine learning algorithms that comprise neural networks, and offers the ability to strategically characterize the complex and often recursive interdependencies in the problem domain using symbolically-represented rules 115, so that design of such algorithms can account for their applicability at known points in the network architecture.

Rules 115 govern the relevance of these known characteristics for the domain of the particular problem being analyzed, or in the context of the present invention, the future state of the particular commodity 102 being modeled. Mapping these rules 115 into the space comprising the architecture of the one or more commodity-specific neural networks 190 helps to improve their design by imparting a greater, more tailored structure. Rules 115 are converted into mathematical representations, which are then applied at various layers, nodes, and connections of the one or more commodity-specific neural networks 190 to realize neuro-symbolic integration. These rules 115 therefore act as an extra layer of algorithmic design for the one or more commodity-specific neural networks 190.

The data analytics platform 100 considers, in one aspect of the present invention, structured data sources 120 in the form of economic and government reports 125, and develops rules 115 from this type of input data 100 that are then converted in mathematical formulas or other representations and applied to map the relevance of these rules 115 into the neural network space for a particular commodity 102 being modeled. As noted above, this imparts a further structure and constraints to the one or more commodity-specific neural networks 190 to improve their design, and adds an extra layer of fine-tuning as knobs referenced herein. In effect, this application of neuro-symbolic integration introduces attention agents to the neural network modeling layer, to provide persistence of thought as to the behavior of commodities, as well as explainability, at least in part by remembering prior states and accounting for their relevance for the state of the commodity 102. Rules 115 may also occur and be ingested in unstructured data sources 130, and therefore it is to be understood that rules may be developed for the neural network modeling layer from many different sources.

In the data analytics platform 100, these rules 115 are processed for encoding into the structure of the one or more commodity-specific neural networks 190 so as to map them into the neural network space. Rules 115 may initially be represented as economic fundamentals, and derived based on the economic and government reports 125, and may also be represented in or derived from economic indicators 111, commodity-specific data 112, and any other type of input data 110, either structured or unstructured. Regardless of the source, rules 115 are converted into numerical vectors in one or more algorithms designed to interpret their relevance to the commodity 102 by developing mathematical representations, equations, or numerical values for these rules 115, for each commodity 102, for example as weights, biases, and mathematical elements or functions, irrespective of whether the rules 115 are initially represented as structured, time-series data (in structured data sources 120) or unstructured, natural language data (in unstructured data sources 130). This may also include assigning a timestamp indicative of a temporal or transient component. Regardless, rules conversions may be based, at least initially, on assessment of the magnitude, or importance, of each rule 115 for the commodity 102, either alone or in combination with other rules 115, and the interoperability of rules 115 where multiple rules 115 can be used to influence a future commodity state. The data analytics platform 100 therefore may apply one or more algorithms in an encoding process that identify this magnitude, as well as assigning the vectorized representations in the mathematical representations, equations, or numerical values.

The algorithms for the encoding process also determines how, where and when the calculated weights, biases, and other mathematical elements or functions are mapped to design of the one or more neural networks 190, and where those weights, biases, and other mathematical elements or functions are to be instantiated in the one or more neural networks 190. Additionally, the algorithms determine the temporal nature of a particular rule 115, to account for any transience or decay in the relevance of a rule 115 or combination thereof when applying them to a particular problem domain for a commodity 102. This may be reflected in the timestamp noted above, a feedback loop, or any other representation of transience depending on the particular rule 115, the commodity 102, or other input data 110. Rules 115 may be continuously analyzed, and weights, biases, and mathematical elements continually calculated and developed, as new input data 110 is ingested into the data analytics platform 100 and commodity states are analyzed for each commodity 102.

In one example of an application of such neuro-symbolic integration in the neural network modeling layer of the data analytics platform 100, a front-end layer may be applied to feed rules-based knowledge to a commodity-specific neural network 190 in the form of these weights, biases, and other mathematical elements or functions. In such a design, the mathematical elements representing vectorized representations of rules 115 are applied at an input layer of the one or more commodity-specific neural networks 190, so that one or more additional inputs to a commodity-specific neural network 190 are added that represent specific knowledge in rules 115 relative to the commodity state for the commodity 102, or existing inputs modified with such specific knowledge. Alternatively, or in addition, the weights, biases, and other mathematical elements and functions representing these rules 115 may also be added to the one or more commodity-specific neural networks 190 at nodes or connections between nodes in the middle, processing layer of a commodity-specific neural network 190. Still further, the rules 115 may be applied at the output layer of a commodity-specific neural network 190. Representations of rules 115 may therefore be applied at the front layer, the middle layer, and the output layer of neural networks, in any combination, depending on the nature of the rule 115, interoperability of rules 115, and relevance to the particular commodity 102 being modeled. Regardless, the weights, biases, and other mathematical elements and functions representing these one or more rules act, as noted above, as tuning knobs for the one or more commodity-specific neural networks 190, and as noted above, provide constraints to the overall architecture to realize substantial design improvements.

Economic fundamentals, expressed at least in the economic and government reports 125, are typically expressed as structured, time-series data. In a further aspect of the present invention, this information may be discerned by the neural network modeling layer so that the one or more commodity-specific neural networks 190 are able to recognize and characterize patterns in changes in commodity states that have relationships to such economic fundamentals (and combinations thereof), and their weighted relevance thereto. The neural network modeling layer may therefore have the ability to self-design and self-encode, so that the data analytics platform 100 learns when such economic fundamentals become relevant, which ones become relevant, and where and how to characterize them as mathematical relationships in the particular neural network architecture develop to address the problem domain for the particular commodity 102 being modeled. Sub-rules may also be developed by these one or more encoding algorithms, based for example the design equations developed and markers, temporal or otherwise, and encoded into the design of the one or more commodity-specific neural networks 190, particularly where the one or more commodity-specific neural networks 190 have learned about the applicability of rules and their relevance to each commodity 102.

The neural network modeling layer of the data analytics platform 100 may include a rules management and integration layer 199 configured to integrate rules 115 in the one or more commodity-specific neural networks 190. The rules management and integration layer 199 may be configured to identify rules 115 of importance for a particular commodity 102, apply the one or more encoding algorithms that develop the weights, biases, and other mathematical elements or functions representing those rules 115, and assign them to the design of the one or more neural networks at the appropriate place in the architecture thereof, and at the appropriate time. This rules management and integration layer 199 may also include processing the rules 115 to convert them into numerical vectors, and therefore one or more algorithms may be invoked to assess the nature of the rule 115, and where the rule 115 is expressed in natural language terms, determine a sentiment that can be used to calculate a vector representing the rule 115.

Constraints represented by rules 115 may also be considered as comparisons or checks against known trends or anticipated or modeled outcomes, and rules 115 and sub-rules may therefore also be applied to act as such comparisons or checks at various points in a neural network. For example, if a commodity state is expected to trend in a particular direction based on other input data 110, a rule or combination of rules may be used to compare such a modeled outcome against an expected outcome and confirm the results.

Deep-Learning Meta Networks

The one or more commodity-specific neural networks 190 are configured to adjust 197 the commodity forecasting algorithm 180 to generate augmented forecasts of the commodity state(s) by developing further characteristics that explain why a text-based vector is relevant to a commodity state, and which represent an expanded or improved taxonomy of relevant indicators. Such an expanded or improved taxonomy may be built automatically, for example based on an automated curation of such additional keywords and other data points for each specific commodity 102, or may be manually constructed. Regardless, such taxonomies serve as a basis for improving designs of production neural networks 191, and also serve as a basis for developing training data sets for the training neural networks 192. These functions may be performed in one or more deep learning meta networks 200 as discussed further below.

Design of neural networks may generally be considered a shamanic art due to vast differences in architecture and the mathematical functions that govern data processing in them; in other words, topologies of neural networks can vary widely. In the present invention however, those architectures and equations, and the outcomes they are used to generate, can be greatly improved using a deeper approach that 'gamifies' instantiations of neural networks in a multi-level arrangement that results in a higher level of confidence in the outputs generated.

To accomplish this, the neural network modeling layer also includes, as noted above, one or more deep-learning meta networks 200, which operate within the multi-layer machine learning-based model and data analytics platform 100 to further evaluate elements of the various types of input data 110 and enhance the function of the one or more neural networks 190, and consequently the performance of the commodity forecasting algorithm 180 to drive more improved output data 210. This represents a further, and deeper, application of artificial intelligence to the problems being solved in the present invention, and includes elements of both deep reinforcement learning, where the system automatically creates efficient prediction algorithms based on curations of input data 110, and unsupervised meta-learning, where machine learning algorithms themselves propose their own task distributions and optimal neural network topologies for a gamification of the one or more commodity-specific neural networks 190.

The one or more deep-learning meta networks 200 are configured to improve the performance of the one or more commodity-specific neural networks 190 by extracting metadata 201 from existing, processed input data 110, and developing and analyzing further taxonomies 205 of indicators from a continuous curation of corporate communications documents 136 for each commodity being analyzed. These are evaluated and applied to infer relevance in new, unprocessed items of input data 110 that are either un-curated, unlabeled, or both. This initial approach is used to drive three primary functions of the one or more deep-learning meta networks 200: improve upon training data sets 204 for the one or more training neural networks 192, at least by matching with known outcomes based on time-series data (reinforcement learning); improve upon the forecasts generated by the production neural networks 191 using the sentiment 161 divined from sentiment discovery performed by the natural language processing engine 160 as applied to the discrete-time data points 178, by adjusting the outputs 207 and design of the one or more commodity-specific neural networks 190 (deep reinforcement learning); and optimize topologies 206 of neural networks (unsupervised meta learning). In the second and third of these functions, task distribution involves ascertaining what sentiment influences outcome over time. The third function acts as a bound on the second, as ultimately optimal topologies should produce the best outcome of the reinforcement learning-based prediction. Finally, the second and third functions involve developing the various parameters (mathematical elements, such as weights and biases, or "knobs" that produce finely-tailored, commodity-specific outcomes) of the neural network that are utilized; the second, in prediction, involves determining what these parameters should be, while the third involves placing and tuning those parameters, at nodes and connections, in optimal neural network architectures or topologies.

At one level thereof, one or more deep-learning meta networks 200 are an instantiation of "deep" reinforcement learning, which decomposes problems to be solved (in the context of the present invention, forecasting a future state, or price, of a commodity) into smaller pieces, and evaluates ways in which commodity value is influenced by surrounding events or actions over time. This is accomplished by developing and analyzing deeper relationships between the commodity, its price or value, and those surrounding events and actions, and improves modeling paradigms for solving the problems by discerning patterns and discrepancies 203 in the circumstances in the way that prices for commodities behave over time. At a further level, the one or more deep-learning meta networks 200 also include an instantiation of unsupervised meta learning, which acts as a bound on the deep reinforcement learning to produce the best possible outcomes of the reinforcement learning-influenced predictions.

The one or more deep learning meta networks 200 are an approach to machine learning in the present invention which seek to improve the performance of the one or more neural networks 190, and consequently to generate forecasts of commodity prices which represent much higher levels of confidence. In this multi-level approach, and returning to FIG. 1, the one or more deep learning meta networks are configured to perform several functions. The one or more deep learning meta networks are configured to extract and analyze metadata 201 in existing input data 110, and analyze corporate communications data 136 to identify clusters 202 of relevant keywords and keyword pairings based on existing taxonomies of curated data. These activities are utilized to infer relevance in new documents that are ingested into the data analytics platform 100 that are un-curated, or unlabeled. In this manner, as the new information about each commodity is ingested, the neural network modeling layer is able to train itself both to identify relevant documents, and build on existing taxonomies of indicators for each commodity being analyzed. Still further, identifying such clusters 202 also enables development of a taxonomy corpus that is entity-specific as to the entity generating the corporate communications documents 136, and allows for training on entity-specific neural networks.

The one or more deep-learning meta networks 200 may be applied, in one example, to initiate a "cold start" for development of a taxonomy signature for user 104, for example where a new user 104 is onboarded. Such a cold start process may therefore serve to develop an initial taxonomy corpus during an initiation of the data analytics platform 100.

As noted above, supervised learning is an application of mathematical functions in algorithms that classify input data to find specific relationships or structure therein. Supervised learning is one type of machine learning paradigm; another machine learning paradigm is reinforcement learning, in which networks look for actions over time to maximize a reward signal or a value function, by studying ways in which an agent (or, an item or characteristic being modeled) interacts with its environment (or, the factors that exerting influence on that item or characteristic). Reinforcement learning generally involves three main theoretical building blocks: a value function, a policy representation for the value function, and a model for analyzing the value function given the policy representation. A further level of reinforcement learning, known as deep reinforcement learning, uses powerful representations offered by neural networks to improve each of the building blocks to translate incoming data inputs to maximize the value function.

Deep reinforcement learning is a combination of neural network methodology and reinforcement learning, and involves a process of creating efficient algorithms that learn from a more in-depth understanding of input signals. In the present invention, the deep learning meta networks 200 apply this combination, by using metadata extracted 201 from both structured data sources 120 and unstructured data sources 130, and a further taxonomy of indicators 205 developed from longer-range, commodity-relevant corporate communications documents 136, at least to improve upon training data sets for training neural network(s) 192, and the outcomes of the production neural network(s) 191. The one or more deep learning meta networks 200 are therefore a deeper layer within the neural network modeling layer. Both of these functions are designed to produce outcomes in forecasts of future prices which are as close as possible to simulations of commodity prices using historical pricing data, and improve the overall accuracy of the multi-layer machine learning-based model.

Unsupervised meta learning is an extension of deep reinforcement learning, in which experience from learning previous tasks is leveraged to learn new tasks quickly, yet where the reward function is unknown, and where the system is given unlabeled data. This type of meta learning is an instantiation of unsupervised learning within reinforcement learning, where the system proceeds without knowing the reward by evaluating worst-case scenarios and learning what should be the reward as it makes those evaluations. Unsupervised meta learning enables a gamification of the one or more commodity-specific neural networks 190, by offering optimized architectures of neural networks from data that is un-curated and unlabeled, and without knowing that the reward is the commodity price that most closely aligns with historical data.

Task distribution in this unsupervised meta learning level of the one or more deep learning meta networks 200 involves, at least in part, divining the influence of sentiment on commodity prices over time. Unsupervised meta learning from such a task distribution is acquired automatically, rather than from a manual design of those tasks. While no assumptions about the reward function on which it will be evaluated at test time are made, unsupervised meta learning does rely on the assumption that dynamics of such a task distribution/reward function environment remain largely the same.

In unsupervised meta learning, machine learning algorithms themselves propose their own task distributions within this environment, given un-curated and unlabeled data, by automatically and continuously curating new commodity-specific data as it is ingested. In the present invention, proposing (or learning) a task distribution includes optimizing parameters for the reward function that maps variables (sentiment) to different reward functions (price prediction) for each commodity. The resultant set of tasks may be considered as a task-based learning procedure, but since the reward is unknown, in unsupervised meta learning, it is evaluated based on the regret expected from a worst-case task distribution in which a difference in expected reward of a sub-optimal learning procedure is compared with an optimal learning procedure.

In this manner, unsupervised meta learning causes the system to discover its own optimized task distributions based on reward functions that it learns based on environmental similarities. Unsupervised meta learning is therefore utilized to learn best approaches for improving the production neural network(s) 191 and the training neural network(s) 192, by defining and optimizing topologies 206 for neural networks based on the proposed task distributions, including the number of layers, nodes, and connections and the mathematical functions governing them, node/vector assignments, and placement and tuning of parameters for nodes and connections such as weights and biases.

Optimizing topologies 206 for neural networks is an application of unsupervised meta learning that forms the gamification function of the one or more deep learning meta networks 200 of the data analytics platform 100. In such a gamification function, the present invention includes tools for designing neural networks that are customized for particular applications. This is accomplished by identifying what information already exists, and applying existing knowledge—in terms of 'building blocks' that define the task distribution and reward function environment from prior outcomes—to construct new topologies that are specific as to the application involved (for example, a forecast of a future price of feeder cattle or #2 corn). This involves defining what is missing in these building blocks, matching new inputs within the building blocks as they are ingested, based on guesses as to where they fit, and generate outputs. This arrangement is performed continuously, and compares outputs of these new topologies to tune, or adjust, neural network parameters to arrive at the most accurate neural network designs for those particular applications.

Returning again to FIGS. 1A-1D, in the data analytics platform 100, the one or more deep learning meta networks 200 extract metadata 201 from one or both of structured data sources 120 and unstructured data sources 130, and ingests corporate communication data 136 to develop a further taxonomy of relevant indicators 205 for a specific commodity 102. The one or more deep learning meta networks 200 utilize deeper analyses from the extracted metadata 201 and further taxonomy of relevant indicators 205 to improve upon the forecasts 214 of commodity prices or states at future times in the production neural networks 191, improve training data sets 204 for the training neural network(s) 192, and develop topologies 206 for more efficient instantiations of those production neural network(s) 191 to further increase accuracy in the outputs of the commodity-specific neural networks 190. These functions are applied to adjust 207 the performance of both the one or more commodity-specific neural networks 190 and the commodity forecasting algorithm 180.

Efficiency and optimization in the improved topologies may be realized by more accurate calculations that are designed to generate predictive outcomes on future data that are as closely aligned as possible with simulations from training and testing data. As with any neural network, training of a network simulates using past, or known information, testing of network simulates using current information, and the production network simulates using future information. Efficiency and optimization in the improved topologies may be realized by developing neural networks in which the nodes, connections, weights, and biases are tuned so that the outcome of the production network most closely matches simulations generated by training and testing implementations of neural networks. The more accurate calculations are used to design neural network topologies which realize improvements in efficiency and optimization.

The deep learning meta networks 200 of the present invention are therefore additional implementations of neural networks configured to learn how to improve the outcomes generated by the one or more neural networks 190, reinforced by a deeper understanding of how the input data 110 is influenced by, characterized by, or affected by its environment. The agent—in the present invention, a selected commodity 102—has a price that is necessarily influenced by characteristics which affect sentiment (its "environment") through various interactions, such as economic policy and activity, weather, etc. In the present invention, the value function of the deep learning meta networks is a commodity price prediction, and the policy representations for that value function are both building a training data set based on insights from extracted metadata 201, and building a further taxonomy of indicators 205 from corporate communications documents 136. The present invention evaluates these deeper inputs to maximize the value function by developing both further training data sets 204 for the training neural networks 192, and developing topologies 206 for the neural networks in which improvements from identification of relationships in sentiment are realized.

The further taxonomy of indicators 205 is used to gain a deeper understanding of factors influencing commodity sentiment, at least from an analysis of longer-range corporate planning. This may include evaluation of corporate communications data 136, for example in reports submitted by companies as part of mandatory regulatory filings, either because of publicly-traded stock, obligations arising from participation in regulated debt markets, or both. This further taxonomy of indicators 205, which may be developed by both automatic, algorithm-driven crawling and scraping of such reports, and a human curation thereof, is used in the present invention for both improved accuracy in relevance 194 of the text vectors assigned to nodes and connections in nearer-term neural network models, and for the modeling of neural network topologies 206 for longer-term, future instantiations of production neural network(s) 191, in terms of text vector-node assignments, weight/bias calculations, weight initializations (initial weight values) and more deeply, the mathematical formulas that give rise to the arrangement of optimal blocks given a particular problem to be solved. Still further, the one or more deep learning meta networks may also be configured to compare outcomes of revised topologies 206 against outcomes of the training neural network(s) 192, and select a topology representing a best-fit outcome as compared to the training neural network 192. Still further, the data analytics platform 100 may instantiate a selected topology for the production neural network 191, and apply the selected topology to generate augmented forecasts 188 in the commodity forecasting algorithm 180.

The corporate communications data 136 may be used, for example, to develop clusters 202 of information that are specific to certain commodities relative to the operations of particular companies. Extracted metadata 201 and clusters 202 help to identify indicators of both intra-commodity relationships and intra-industry relationships. Clusters also inform the further taxonomy of indicators 205, because they provide insight into particular large-scale entities that are involved in predicting long-range commodity prices, as well as their projections for the production of those commodities over those longer time periods. In other words, they enable improvements in forecasts 214 because they involve detailed projections of markets for commodities, over longer time periods, providing earlier indicators of sentiment.

Extracting metadata 201 involves evaluating both structured data sources 120 and unstructured data sources 130 to identify patterns and discrepancies 203 which further inform the sentiment analysis derived from processing each type of input data 110. While the natural language processing engine 160 and the time-series modeling engine 170 both determine some form of sentiment from input data 110, the one or more deep-learning meta networks 200 derive deeper relationships based on this metadata to further explain how keywords, and their frequency of occurrence and distance, inform the sentiment. This is used at least to improve the training data set 204 for the training neural network(s) 192.

Figure 3:
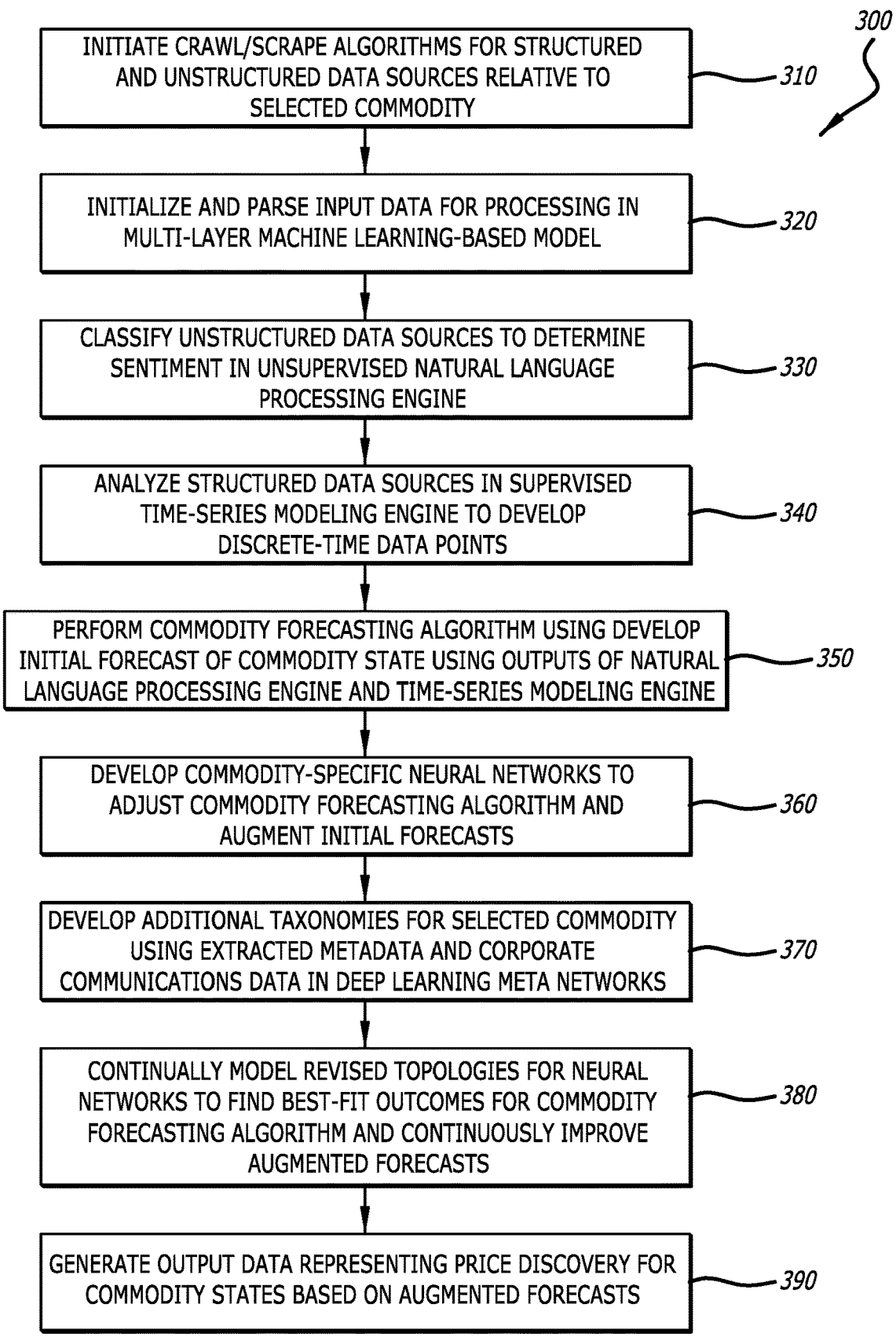
FIG. 3 is a flowchart of steps in a process of performing a data analytics platform according to the present invention.

FIG. 3 is a flowchart of steps in a process (or processes) 300 for performing the various functions within the multi-layer machine learning-based model and the data analytics platform 100, according to one embodiment of the present invention. In this embodiment, the process 300 begins by initiating crawling and scraping algorithms 310 for input data 110 relative to a selected commodity, such as, for example, those non-numerical, unstructured data sources 130 for which text must be converted from its original format (such converting audio files 134 or video files 135 to text for transcription). Step 310 may or may not be initiated by a request 105 made by a user 104. At step 320, all of the input data 110 is initialized and parsed for further processing in the data analytics platform 100, and prepared for sending to the various aspects of the multi-layer machine learning-based model, depending on the type of content therein.

At step 330, unstructured data sources 130 are passed to the unsupervised, natural language processing engine 160 to classify the information therein and extract a sentiment 161 regarding the selected commodity 102. The unsupervised natural language processing engine 160 performs a plurality of algorithms at step 330 to process such input data 110, including a relevance algorithm 162, a sentiment analysis algorithm 167, and a text vectorization algorithm 168, to prepare a classified data set for the commodity forecasting algorithm 180. Step 330 may also include applying one or more classification neural networks 164, which are configured at least in part to improve the classification of input data 110 and extraction of sentiment 161 therein, by developing a taxonomy 166 for each selected commodity 102 as new unstructured data sources 130 are ingested into the data analytics platform 100. Such a taxonomy 166 may be developed from a human curation or an automated curation 165 of these further unstructured data sources 130, and may be utilized to identify a training dataset 166 for the one or more classification neural networks 164 as it learns from past classifications and the sentiment 161 therein. In step 330, the sentiment 161 is converted into a numerical array 169 comprised of text-based vectors, representing a taxonomy signature for the selected commodity 102.

At step 340, the structured data sources 120 are passed to the supervised, time-series modeling engine 170 for the particular input data 110 therein to convert the historical pricing data and other information into a series of discrete-time data points. At step 340, the supervised time-series modeling engine 170 performs a statistical data analysis on historical and/or real-time or current data over the prior period of time. This includes removing any bias or noise 176 in such data, and converting as noted above the input data 110 into a series of discrete-time data points 178 that represent temporal indicators that acts as influences on the state of a selected commodity 102 during that prior period of time.

At step 350, the process then performs the commodity forecasting algorithm 180, using outputs from the natural language processing engine 160 at step 330 and the time-series modeling engine 170 at step 340. This includes identifying temporal parameters 184 for modeling the state/price of the selected commodity 102, such as a starting date, a time period length/duration, and an end date for an initial forecast 182 of the commodity price at the specified future time. It may further include normalizing 186 the two sets of inputs coming from the natural language processing engine 160 and time-series modeling engine 170, respectively, by identifying timestamps that associate the one or more textual vectors in the numerical array 169 with the sequence of discrete time data points 178 to create a set of classified, normalized content 186 for the selected commodity 102 that represents variables having an influence over the commodity state over the specified period of time, as well as generating the initial forecast 182 for the selected commodity 102 at the specified future time.

At steps 360 and 370, the present invention applies one or more commodity-specific neural networks 190 (step 360) and one or more deep learning meta networks 200 (step 370), to improve upon the initial forecast 182 generated by the commodity forecasting algorithm 180. In step 360, the data analytics platform 100 augments the initial forecast 182 generated by the commodity forecast algorithm 180 by adjusting 197 the mathematical functions that drive the performance of the one or more commodity-specific neural networks 190 as more, and deeper, information is ingested and processed to generate augmented forecasts 188.

This is further enhanced in step 370, in which the one or more deep learning meta networks 200 continuously seek to improve the performance of the one or more commodity-specific neural networks 190, by developing additional taxonomies for each selected commodity 102 from additional information extracted from corporate communications data 136, and from the metadata extracted from input data 110 as noted above. In step 370, one or more deep learning meta networks 200 develop indicators of intra-commodity relationships or intra-industry relationships between the structured data sources 120 and the unstructured data sources 130 based on extracted metadata 201 and the corporate communications data 136 in further taxonomies 205, and develops further training data sets 204 for the one or more commodity-specific neural networks 190.

At step 380, the one or more deep learning networks 200 also model revised topologies of the one or more neural networks, including the design of nodes, connections, calculation and assignment of weights and biases, determining weight initializations, and general development of the mathematical functions that comprise the one or more commodity-specific neural networks 190. This includes comparing outcomes of the revised topologies against the outcomes of the training data neural network 192, selecting a topology (ies) representing a best-fit outcome as compared to the training neural network, and applying the selected topology (ies) to continuously generate augmented forecasts 188.

At step 390, the process 300 generates output data 210. Output data 210 as noted above represents price discovery 212 of all forecasts 214 of future commodity states, based on the augmented forecasts 188 of the commodity forecasting algorithm 180, as modeled in steps 370 and 380.

Figure 4:
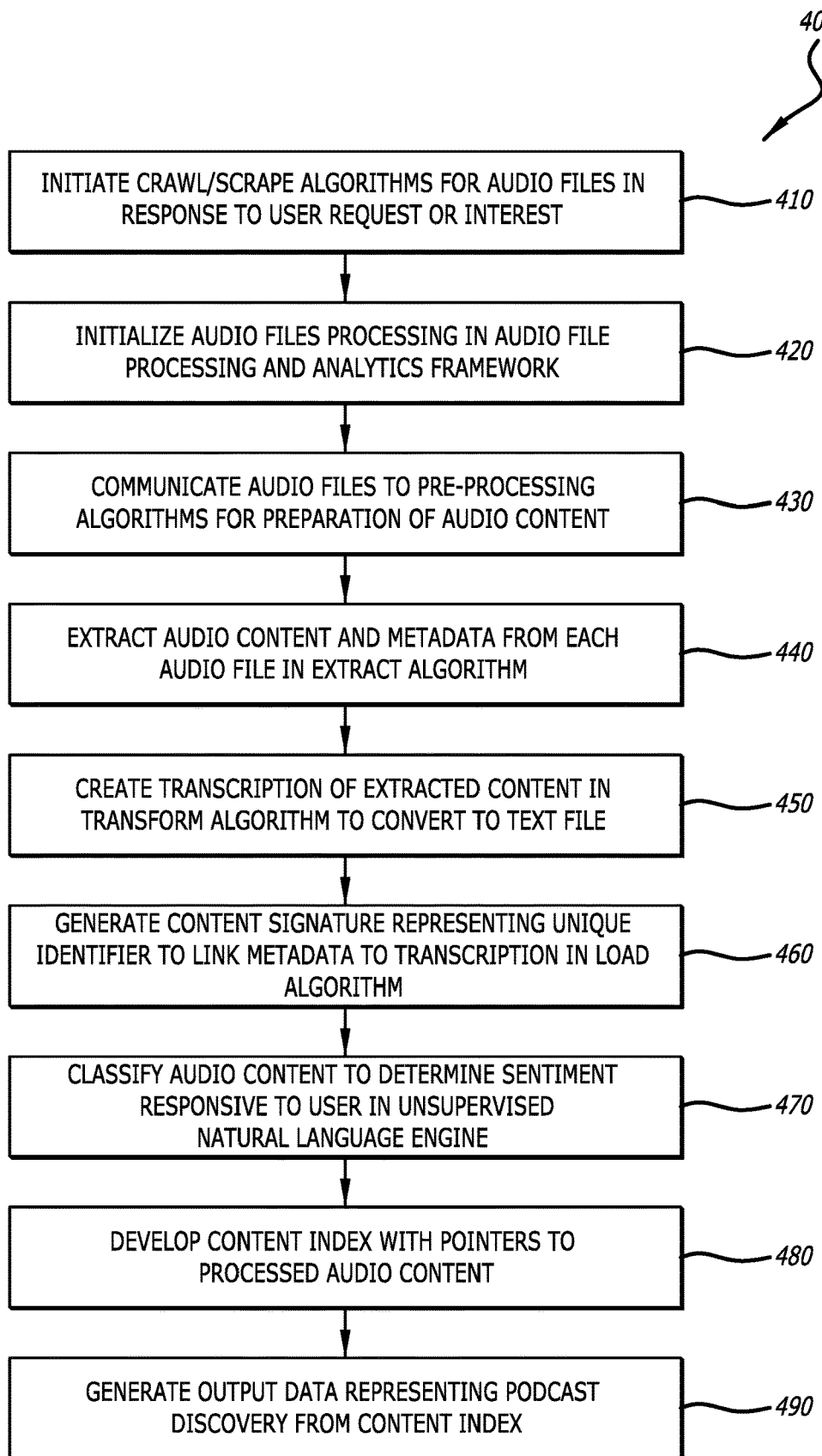
FIG. 4 is a flowchart of steps in a process of performing podcast discovery within audio file processing and analytics framework according to the present invention.

FIG. 4 is a flowchart of steps in a process (or processes) 400 for performing the various functions within an audio file processing and analytics framework 500, according to one embodiment of the present invention. In this embodiment, the process 400 begins by crawling and scraping 410 for input data 110 in response to user-identified interests in a user request, such as, for example, those unstructured data sources 130 such as audio files 134, for which text must be converted from its original format for transcription. Step 410 may be initiated by a podcast discovery tool 560, or by the user request itself. Regardless, at step 420, all of the input data 110 is collected and initialized for further processing in the audio file processing and analytics framework 500, and prepared for sending to the various elements of a podcast discovery engine 510.

At step 430, audio files 134 are passed to a set of pre-processing algorithms that are configured to prepare content in each audio file 134 for subsequent processing in the unsupervised, natural language processing engine 160 to classify the information therein and extract sentiment 161. At step 440, an extract algorithm 512 is applied to each audio file 134 to extract audio content and metadata from an audio file 134, and store this information in a database collection. At step 450, a transform algorithm 514 is applied to this information to convert the content into a text file and to create a transcription of the content. At step 460, a load algorithm 516 is performed to link the metadata to the transcription to generate a content signature that represents a unique identifier for each relevant piece of content for each audio file 134.

At step 470, the unsupervised natural language processing engine 160 performs a plurality of algorithms to process the transcription and the content signature for each audio file, to classify the audio content to determine a sentiment 161 that is responsive to the user request. This step includes assigning a relevance value to the audio content, and determining the sentiment 161 in the audio content. This is done by searching for one or more sentiment keys within a pre-defined proximity at least of each taxonomy member, calculating positive counts and negative counts for each occurrence of the one or more sentiment keys for the content, and converting the sentiment 161 into a numerical array comprised of one or more text-based vectors representing the content signature.

At step 480, the process 400 then develops a content index that includes pointers to the processed audio content based on the numerical array. This content index is then stored and used to develop output data from the audio file processing and analytics framework 500. At step 490, the process 400 generates, in response to user requests, many different types of information; the content index may be used to generate a display of the index of audio content, a list of audio files that include the audio content, alerts for publication of the one or more audio files, summaries of audio files, recommendations or notifications of relevant content that may be of interest to the user, etc. A podcast discovery tool 560 may be used to convey this information to the user, and may also be utilized by the user to customize the processing performed in the process 400 and the audio file processing and analytics framework 500.

The present invention may include a support tool 220 that allows users 104 perform a number of functions. For example, users may utilize such a support tool 220 to select commodities to analyze, set time periods over which to develop forecasts, and to customize the type of output desired. Users may also select or provide input data 110 via such a support tool 220. The support tool 220 may be configured to be utilized via a display such as a graphical user interface and/or via web-based or application-based modules resident on mobile telephony, tablet, or wearable devices, and may include widgets, pull-down menus, and other indicia that enable visual representation and manipulation of the information contained therein. Users 104 may be able to configure settings for, and view various aspects of, the data analytics platform 100 using these visual representations.

The support tool 220 may further enable one or more enterprise or consumer access portals, through which enterprise customers can view and utilize the visual representations that are part of the data analytics platform 100. These portals may include aspects of the user interface and user experience on both the front end (such as the content acquisition layer) and back end (such as the sentiment and time-series modeling layers, sentiment classification and training layer, application layer, neural network modeling layer, etc.) of such a data analytics platform 100, as well as aspects of the inner workings of the present invention (for example, manually curating the natural language processing engine 160 by classifying unstructured data sources 130 as they are later ingested in the one or more classification neural networks 166. The support tool 220 may therefore enable creation of a hyper-personalized profile that enables a customized set of portals depending on the user's needs, the type of user, etc.

In one embodiment of the present invention, the user interface and user experience may be comprised of a radio "button" on a customer's own trading or research screen. A customer wishing to access the processing performed in the data analytics platform 100 presses, clicks, or otherwise interacts with this radio button to implement the data analytics platform 100 and generate its various forms of output data 220 on the customer's own screen. In effect, the customer is accessing all or a portion of the data analytics platform 100 via such a radio button. The radio button may include multiple buttons, and may provide access to a plurality of functions, which may be accessed for example via pull-down menus or other areas or buttons on the same trading or research screen or on different screens. Access to the data analytics platform 100 in this manner may be provided through one or more APIs.

The present invention is configured, in one aspect thereof, to model the future of state of a selected commodity 102. Commodities are raw materials or primary products, and as noted above, may include agricultural or livestock commodities, such as corn, soybeans, wheat, rice, cocoa, coffee, cotton, and sugar (for agricultural commodities) and lean hogs, pork bellies, live cattle, and feeder cattle (for livestock commodities). A selected commodity 102 may also include other commodities, such as energy (for example, crude oil, heating oil, natural gas, and gasoline) and metals (for example gold, silver, platinum, and copper).

There are many additional and more specific examples of other commodities whose future price or value may be modeled within the data analytics platform 100 of the present invention. For example, an energy commodity may be RBOB (reformulated blendstock for oxygenate blending) gasoline, ethanol, propane, low-sulfur diesel, and coal. Additionally, an area, source or other sub-type for the commodity may also be specified; for example, crude oil is a commodity having many different varieties, and may be traded as Brent crude, WTI (West Texas Intermediate) crude, Dubai crude, Louisiana light crude, and the like.

The present invention may also be configured to model the future state of assets other than commodities, and that any assets among the traditional financial asset classes may be modeled and are within the scope of the present invention. Indeed, any commodity or asset whose future state, such as its price or value, may be forecasted is within the scope of the present invention, and therefore this specification is not to be limited to any one commodity or asset described herein.

Other assets that may be modeled within the data analytics platform 100 include fixed income, credit, equities, and foreign exchange or currencies. Fixed income assets are typically bonds, while equities are typically stocks. However, it is to be understood that any type of bond (or other debt instrument), any type of stock (or other equity instrument), any type of credit instrument, and any currency (or basket thereof) may be modeled within the data analytics platform 100 of the present invention.

As noted above, the data analytics platform 100 may be configured to generate output data 210 relative to or representing the future state of the selected commodity 102 that may take many forms. Such output data 210 may include forecasts 214 of the commodity price at some future point in time or time period, such as for example a price discovery mechanism 212 represented as a spot price 216 or a futures price 218. Many other price forecasts are possible, such as a forward, a swap, etc.

Output data 210 may also take other, follow-on forms of the forecasts 214, such as for example a display 219 of the output data 210 (such as a forecast 214 at a particular point in time). Such a display 219 may be provided on a graphical user interface for a user to view the output data 210 (and other information), for example on a screen configured with a computing device.

The present invention may also include actionable outcomes 230 of such output data 210, such as scheduling and/or executing trades or transactions 231. For example, the present invention may include the ability to automatically schedule such a transaction or trade 231 based on the forecasted commodity state 214. The present invention may also provide a trading platform 232 within the output data 210 can be acted on, so that for example the outputs from the data analytics platform 100 flow through to the trading platform 232 as one large enterprise or consumer product offering, and regardless of whether the trading platform 232 is configured to human trading, or machine learning/artificial intelligence-driven trading, or both.

The output data 210 may further include more advanced trading tools 233 that enable, for example, hedging for price stability 234, to act on the predictions and forecasts of commodity prices. Such tools 233 may be used by enterprise customers such as manufacturers or commodities processors to enter into hedges, or futures positions, for the purpose of price stability on a selected commodity 102, or a derivative of a selected commodity 102. For example, where the selected commodity 102 is feeder cattle, feedlot producers know that they will require feed several times a year, so they may use the present invention to enter futures positions to stabilize the purchase price of the derivative commodity—for example, corn—throughout the year, with the forecasted price of the actual selected commodity 102 (feeder cattle) in mind. Other specific trading tools 233 may also be implemented, for example grouping or batching information relative to commodities forecasts or the input data 110 used to arrive at such forecasts 214.

The present invention may be further configured to generate in-depth content 235 based on the processing performed within the data analytics platform 100 and the forecasts generated therefrom. Additionally, in-depth content 235 may be customized according to the needs of the user 104. For example, in-depth content 235 may include research and analytics 236 tools based on the processing of input data 110, and may be configured to generate reports 237, recommendations 238, risk assessments 239, or alerts 240. For example a recommendation 238 to enter into positions to hedge the prices of commodities 102 at various future times may be generated as part of the output data 210. It is to be understood that many examples of such in-depth content 235 are possible, and within the scope of the present invention.

The present invention contemplates that many layers of application programming interfaces (APIs) may be utilized within the data analytics platform 100, for example to enable ingest of particular forms of input data 110, or customized uses of the output data 210. One layer of APIs may be utilized to connect input data feeds with the data analytics platform 100 itself. Different APIs may be provided for each type input data 110, as structured data sources 120 and unstructured data sources 130 have different formats and content, and require pre-processing to be scraped. APIs may be managed by an API module 250 (not shown in FIG. 1) specifically configured to enable the APIs, for example as a specific sub-module of the data retrieval and initialization module 150 for intake of certain types of information that require a particular format or conversion from a particular format. The data retrieval and initialization module 150 may itself be thought of as a layer of APIs configured to crawl for, ingest, and scrape content from the structured data sources 120 and the unstructured data sources 130.

A further layer of APIs may be utilized to ingest certain information for specific portions of the multi-layer machine learning-based model. For example, data retrieval and initialization module 150 may retrieve corporate communications data 136 via such an API layer that provides this information directly to the deeper layers of processing performed by the one or more neural networks 190 and/or the one or more deep learning meta networks 200, and extracts information from such corporate communications data 136 for further analytics.

A further layer of APIs may be provided for output data 210. One or more APIs may be developed to enable the follow-on forms of the output data 210 as discussed above. Third parties, for example, may utilize such APIs to develop their own, follow-on uses of the output data 210, such as to customize reports 237, recommendations 238, risk assessments 239, or alerts 240 or develop their own enterprise-specific trading tools 233. APIs may also be provided to enable customized interfaces via the support tool 220, for example the hyper-personalized profile referenced above.

Consumer Applications of Data Analytics Platform

The present invention contemplates that many additional applications of the data analytics platform 100 are possible, for enterprise, consumers, and other users. It is therefore to be understood that the output data 210 may be tailored for different ones of these additional applications, and that the data analytics platform 100 itself may be instantiated in different configurations, either in whole or in part, to perform those additional applications.

Audio File Processing and Analytics—Podcast Discovery

In another embodiment of the present invention, an audio file processing and analytics framework 500 is one such additional application of the data analytics platform 100 that is configured for identifying, quantifying, and extracting information within audio files 134, such as for example podcasts, streamed audio, smart speaker conversations, audio books, microblogging feeds in audio format, and audio extracted from other file formats such as video on web-based services or sites such as, for example, YouTube™. The audio file processing and analytics framework 500 applies the natural language processing engine 160 to such audio files 134 in a podcast discovery engine 510 that includes additional algorithmic functions in addition to those performed in the natural language processing engine 160 to generate semantically-examined, podcast-specific output data 530. That podcast-specific output data 530 is used to assist interested users in podcast discovery by identifying relevant podcasts based on tone, sentiment, and personalized relevance of a user, as well as identifying portions of podcasts that contain content of interest. This identification of relevant podcasts and portions of podcasts that contain content of interest may further reflect additional and multi-dimensional aspects of such podcasts and portions of content that are discerned from a relevance personalized to the user, such as for example individuals, people, or groups (for example, organizations or corporations) relative to user preferences, spatial attributes (localized to the user, and based for example on identifying indicators or devices, such as IP addresses or locations of mobile devices or other communications devices used by the user such as Bluetooth™ devices), and temporal attributes, such as times of events, temporally-related documents, and other time-specific aspects of user preferences.

Input data 110 for the audio file processing and analytics framework 500 and podcast discovery engine 510 includes audio files 134, and may also include other unstructured data sources 130 that assist in identifying relevant podcasts, and content therein, for podcast-specific output data 530. These may include, for example, news reports 131 and social media feeds 132, and any other textual sources 133 or any other audio files 134 or video files 135 that may provide additional information for identification of relevant podcasts and content therein.

Input data 110 is provided to the data retrieval and initialization module 150, which is configured to prepare audio files 134 and any other relevant information for use in the natural language processing engine 160 to process the audio files 134. Crawlers and scrapers 152 may be configured, as above, to search for relevant data sources and extract information therefrom.

Other input data 110 for the podcast discovery engine 510 of the audio file processing and analytics framework 500 may also include a user request 105, which may impart parameters so that the podcast-specific output data 530 is properly tailored to a user's needs. Still other input data 110 in this embodiment of the present invention may include surveys, questionnaires, and analytics of microblogging history or other social media history of a particular user utilized in the podcast discovery engine 510, for example using metadata associated with messages or information disseminated by the particular user from microblogging or social media platforms.

The podcast discovery engine 510 includes, as noted above, a plurality of algorithmic functions in one or more data processing modules 142 which prepare the audio files 134 for the natural language processing engine 160 in the data analytics platform 100. These algorithmic functions form the podcast discovery engine 510 portion of the present invention, and include an extract function 512, a transform function 514, and a load function 516. The podcast discovery engine 510 effectively sits on top of the natural language processing engine 160 and prepares the audio files 134 (and any other input data 110) for the data analytics platform 100, while also generating the podcast-specific output data 530 from the audio file processing and analytics framework 500.

These algorithmic functions together generate a podcast signature 520 which represents a unique identifier 522 for each relevant piece of content in an audio file 134. This podcast signature 520 is indexed and acts a pointer 524 to the relevant piece of content for the podcast-specific output data 530, and is applied to natural language processing engine 160 to further inform the extraction of sentiment 161 from the audio files 134.

In one aspect of this embodiment of the present invention, a mobile application 540 is developed to present users with certain podcast-specific output data 530, and serve as a platform over which users can manage podcast discovery 532, interact with the podcast index 534, and initiate podcast summary reports 536. Users may also utilize the mobile application 540 to initiate podcast analytics 538 by the press of one or more buttons or specify a particular podcast URL. Users are also notified when a podcast summary report 536 is ready via the mobile application 540. Users may also display a podcast summary report 536 via a graphical user interface using the mobile application 540, as well as initiating playback 550 of a podcast.

In addition to the podcast-specific output data 530, several other follow-on applications of podcast discovery 532 are possible and within the scope of the present invention, whether via the mobile application 540, the podcast discovery tool 560, or via one or more APIs that enable additional functionality. For example, users may be provided with a display 542 of the podcast index, or other podcast-related information, such as a list 544 of audio files 134, alerts and notifications 546, and recommendations 548. Such a display 542 may also include other relevant information representing the content in the podcast or the podcast itself, such as the "who, where, and when"—as noted above, individuals, persons, or groups, or spatial and temporal attributes. Also as noted above, users may also initiate playback 550 of a podcast via the mobile application 540, the podcast discovery tool 560, or via one or more of such APIs. Such a playback may also occur at a specific place in the podcast itself, either as directed by the user or for example as directed from on pointers based on the identification of particular content and/or the multi-dimensional attributes referenced above (or both).

The audio file processing and analytics framework 500 may further include a search tool 562, so that lists 544 of audio files 134 (and links to those audio files 134 or pointers to specific portions of those audio files 134) are generated in response to user requests 105 for podcast content as podcast-specific output data 530. The podcast discovery engine 510 may therefore provide, in one embodiment of the present invention, a multi-modal searching tool 562 as part of the podcast discovery tool 560 that is capable of applying the natural language processing capabilities in the podcast discovery engine 510 to search across all of audio content in files 134, video content in video files 135, and textual content 133 (including all unstructured data sources 130), and provide podcast-specific output data 530 that is responsive to user search requests 105, and on attributes of user search requests 105 that are identified based on user profiles or information learned about users using one or more techniques of machine learning in applications of artificial intelligence. Therefore, the audio file processing and analytics framework 500 may act as a natural language-based podcasting search engine, and the present invention may return search results 545 as podcast-specific output data 530.

Personalized references may be discerned either automatically, or by indicated by the user. For example, users may mark relevant content by interacting with the mobile application 540, such as by voice, by gesture, or by tapping on a screen or interface.

In one aspect of audio file analytics and processing framework 500 of the present invention, personalization, and identifying a personalized relevance, includes a "cold start" onboarding initiation of a hyper-personalization phase, in which an initial, unique taxonomy representing a content profile for a user is automatically generated. Such a taxonomy may be based upon quantifiable attributes such as for example social activity and survey interest (such as 'visual' surveys based on user expressions of interest, or interfaces with cataloged content catalogs such as news applications. The onboarding and initiation of the hyper-personalization phase may further include searching existing collections of information, or directories, already semantically processed by the natural language processing engine 160 for relevant content to build an initial corpus of information for the particular user. The "cold start" onboarding and initiation may also apply the taxonomy by searching existing directories of audio files 134 for new audio material, and establish subscriptions and tracking analytics on an ongoing basis.

Regardless, the audio file analytics and processing framework 500 instantiates a "user profile" and subscribes to a directory feed of audio files 134, a continuous feed of new and semantically-relevant content based on the user profile and associated with the personalized relevance identified for each user.

Real-Time Analytics from Audio File Processing

In still another embodiment of the present invention, the audio file processing and analytics framework 500 of the data analytics platform 100 may be further configured for identifying and extracting information within audio files 134 that are generated from voice commands, or simply from voices of people speaking, for example voices or voice commands captured by a nearby "smart" speaker. The natural language processing engine 160 is configured in such an embodiment to process the audio file(s) 134 and transcribe text therein, and detect whether a response is needed.

For example, one or more smart speakers are present inside a medical operating theater, such as in a hospital setting, and are switched on during a medical procedure. The smart speakers detect voices and voice commands, and the natural language processing engine 160 processes the text obtained from the audio file(s) 134, and determines a relevancy of content in the textual transcription as well as a sentiment 161 therein (for example, is person speaking desiring a response, asking a question, or trying to solve a problem, that is relevant to the procedure being performed). In such an example, the natural language processing engine 160 may detect that surgeons and nurses are trying to solve a problem that has arisen during surgery, and one of them asks the smart speaker for advice. The natural language processing engine 160 determines the relevancy, identifies keywords in the textual transcription, and develops a taxonomy of such keywords and keyword pairings. The multi-layer machine learning-based model, upon detection of the sentiment 161 by the natural language processing engine 160, applies its algorithmic functions and the neural network modeling layer, to provide a most appropriate solution to such problem, by correlating the taxonomy with additional information about the relevant problem, and matches an outcome of such a correlation to generate an automated voice file that contains response that represents a best fit for the problem. The data analytics platform 100 then generates, as output data 210, a playback of an automated voice file generated to express the outcome through the same "smart" speaker that detected the voice commands. In the example of the surgical procedure above, the outcome may be a recommended procedure to solve the problem encountered, expressed in the playback of the automated voice file.

A further application of the audio file processing and analytics framework 500 is as an empathy layer that responds to hostility with empathy, for example in an environment where 'smart' speakers are used in the home or office to respond to voice commands as noted above. For example, it may be the case in those environments that voice commands issued are expressions of anger or frustration, and may include foul language such as swearing; typical responses to such commands in current smart speaker environments is a layer of silence. Following detection of foul language, insults, or derogatory remarks (or, where such language is typed, additional characteristics such as emoticons, the data analytics platform 100 may be configured to provide empathetic and sympathetic responses. For example, to "I hate you Alexa", the empathy layer would respond, "I'm sorry you are frustrated" or another calming response. In one embodiment of the present invention, the empathy layer may be trained on a child's voice, so that the data analytics platform 100 is able to detect when a child is expressing anger or frustration, and respond with calming language that insulates them from the silence that currently follows when smart speakers are issued with such voice commands or expressions.

The natural language processing engine 160 of the data analytics platform 100 in such an empathy layer application is configured to process the text (by converting the audio file 134 generated by voice commands) and identify the speech, by determining the tone and the intent (such as, sarcasm) and other similar characteristics expressed through speech. The multi-layer machine learning-based model then determines an appropriate response to such speech by correlating the textual transcription with further characteristics such as acoustic trends, inflections, changes in volume of the speech, the speaker's voice and other detected characteristics, and matching an outcome of such a correlation to generate an automated voice file that contains the appropriate response. The data analytics platform 100 then generates, as output data 210, a playback of such an automated voice file, again for example through the same speaker that detected the voice commands.

The empathy layer may also be configured to respond to certain speech expressed by text, such as text typed on websites and where Internet-based chatbots provide automated responses thereto. In such an environment, the natural language processing engine 160 of the data analytics platform 100 processes the text and identifies the speech, again by determining the tone and the intent therein. The multi-layer machine learning-based model then determines an appropriate response to such speech, by correlation with further detected characteristics, and matches an outcome of such a correlation to generate, as output data 210, an automated text file in response.

The empathy layer within the multi-layer machine learning-based model of the data analytics platform 100 according to this embodiment of the present invention may further be configured with different application-specific layers. A short-term memory layer is one example of such an application-specific layer, and provides for persistent short-term storage of speech or conversation. In one application of the present invention with such a layer, in response to a user query for playback of conversation from some preceding time period, the present invention searches the preceding time period for relevant conversation responsive to the user query, and plays back an audio portion of that conversation for the user.

A financial term and instrument identification layer is another example of an application-specific layer. This layer recognizes key financial terms, such as names of financial instruments or commodity names in detected speech, and processes speech and content around these terms within the natural language processing engine 160 as part of the process of sentiment discovery for a particular commodity 102.

The systems and methods of the present invention may be implemented in many different computing environments 140. For example, the various algorithms embodied in the data processing modules 142 may each be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, executed on a programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. For example, the input data 110 may be augmented with data collected on hardware or software devices in association with or proximate to an agricultural field, for example crop data or weather data, in the case where the selected commodities are agricultural commodities, for assessment of ground truth observations in real-time. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method, comprising:
ingesting input data comprised of structured data sources and unstructured data sources;
analyzing the input data in a multi-layer machine learning-based model configured to model a state of a selected equity within a specified future time, by:
developing a taxonomy comprising equity-specific keywords and keyword pairings for a selected equity, the taxonomy identifying one or more sentiment predictors for the selected equity from the unstructured data sources,
identifying discrete-time data points constructed from the structured data sources that define temporal parameters relative to the selected equity for the specific future time, and modifying the taxonomy with the temporal parameters to create a set of classified content representing a temporally-relative sentiment for the selected equity,
developing knowledge-based rules representing specific knowledge relative to the selected equity derived from economic and equity-specific indicators in the input data;
mapping the taxonomy and the knowledge-based rules into one or more neural networks each having a topology comprised of a plurality of nodes and connections that are initiated by threshold activation functions representing the set of classified content and the specific knowledge,
tuning the one or more neural networks by identifying additional, temporally-dynamic predictors representing patterns in the taxonomy and the knowledge-based rules that quantify relationships between data points within the set of classified content and the specific knowledge, in at least one deep learning meta network configured to modify the threshold activation functions for the plurality of nodes and connections of the one or more neural networks, and identify and apply adjusted topologies for the one or more neural networks based on the additional, temporally-dynamic predictors; and
generating a forecast of the state of the selected equity at the specified future time.

2. The method of claim 1, further comprising initiating at least one of a display of the forecast of the state of the selected equity, a report of the forecast of the state of the selected equity, and a recommendation based on the forecast of the state of the selected equity.

3. The method of claim 1, wherein the structured data sources include historical pricing data, and the unstructured data sources include one or more of microblogging feeds, information in digital news articles, audio files, and corporate communications documents, the microblogging feeds including user-generated content disseminated in online interactions that further include one or more of text-based posts, text-based comments, digital photos, and videos files, and the audio files are digital audio files that are disseminated over computing networks as podcasts.

4. The method of claim 3, wherein the corporate communications documents include corporate communications data from one or more of securities-related regulatory filings published by corporate entities, debt-related regulatory filings published by corporate entities, and transcripts of earnings-related data sources.

5. The method of claim 1, wherein the specific knowledge relative to the selected equity derived from economic and equity-specific indicators is further derived from one or more of equity-specific technical analyses, equity-specific fundamental analyses, corporate communications data, relationships represented by personnel relative to the selected equity, and reports issued by governmental entities.

6. The method of claim 5, wherein the developing knowledge-based rules representing specific knowledge relative to the selected equity further comprises identifying one or more rules impacting the state of the selected equity at the specified future time, developing at least one graphical representation of the one or more rules, and applying the at least one graphical representation to determine one or more of a numerical array comprised of one or more vectors and weights and biases for the one or more neural networks based on the one or more rules.

7. The method of claim 1, further comprising curating a relevance-based taxonomy signature for the selected equity from the additional, temporally-dynamic predictors, by identifying specific parameters as indicators of one or more inter-equity relationships, inter-entity relationships or inter-industry relationships that define temporally-relevant time periods to quantify the relationships between data points within the set of classified content and the specific knowledge.

8. The method of claim 1, further comprising calculating an initial state of the selected equity within the specified future time based on the set of classified content representing the temporally-relative sentiment for the selected equity in a forecasting algorithm, wherein the one or more neural networks are further configured to modify the initial state of the selected equity in a production neural network, develop a training neural network based at least on the discrete-time data points, and continually update the taxonomy as additional input data is ingested to develop a training data set for the training neural network.

9. The method of claim 1, further comprising calculating and assigning weights and biases for the threshold activation functions for the one or more neural networks based on the set of classified content representing a temporally-relative sentiment for the selected equity.

10. The method of claim 9, wherein the at least one deep learning meta network is configured to tune the weights and biases for the threshold activation functions for the one or more neural networks, by modeling different outcomes of the multi-layer machine learning-based model of the state of the selected equity based on the additional, temporally-dynamic predictors representing patterns in the taxonomy and the knowledge-based rules, and develop modified threshold activation functions based on the outcomes of the multi-layer machine learning-based model, to identify and apply the adjusted topologies for the one or more neural networks.

11. The method of claim 1, further comprising initializing a sentiment discovery engine configured to classify the input data for the multi-layer machine learning-based model, wherein the developing a taxonomy is performed in a natural language processing engine configured to classify the unstructured data sources to determine a sentiment for the selected equity by searching for one or more sentiment keys within a pre-defined proximity of each keyword or keyword pairing, calculating positive counts and negative counts for each occurrence of the one or more sentiment keys for the content to calculate the temporally-relative sentiment for the selected equity, and converting the temporally-relative sentiment into a numerical array comprised of one or more text-based vectors representing a taxonomy signature for the selected equity, and wherein the identifying discrete-time data points constructed from the structured data sources is performed in a time-series modeling engine configured to classify a historical performance of the selected equity to construct a sequence of the discrete-time data points indicative of the historical performance to define the temporal parameters relative to the selected equity for the specific future time.

12. A system, comprising:
a data collection element configured to receive input data comprised of structured data sources and unstructured data sources;
a multi-layer machine learning-based model configured to analyze a state of a selected equity within a specified future time from the input data, the multi-layer machine learning-based model including:
a sentiment discovery engine, configured to develop a taxonomy comprising equity-specific keywords and keyword pairings for a selected equity, the taxonomy identifying one or more sentiment predictors for the selected equity from the unstructured data sources, identify discrete-time data points constructed from the structured data sources that define temporal parameters relative to the selected equity for the specific future time, and modify the taxonomy with the temporal parameters to create a set of classified content representing a temporally-relative sentiment for the selected equity,
a rules discovery engine, configured to develop knowledge-based rules representing specific knowledge relative to the selected equity derived from economic and equity-specific indicators in the input data, and
a neural network modeling layer configured to:
map the taxonomy and the knowledge-based rules into one or more neural networks each having a topology comprised of a plurality of nodes and connections that are initiated by threshold activation functions representing the set of classified content and the specific knowledge, and tune the one or more neural networks in at least one deep learning meta network, by identifying additional, temporally-dynamic predictors representing patterns in the taxonomy and the knowledge-based rules that quantify relationships between data points within the set of classified content and the specific knowledge, modify the threshold activation functions for the plurality of nodes and connections of the one or more neural networks, and identify and apply adjusted topologies for the one or more neural networks based on the additional, temporally-dynamic predictors,
wherein the multi-layer machine learning-based model generates a forecast of the state of the selected equity at the specified future time.

13. The system of claim 12, wherein the multi-layer machine learning-based model is further configured to initiate at least one of a display of the forecast of the state of the selected equity, a report of the forecast of the state of the selected equity, and a recommendation based on the forecast of the state of the selected equity.

14. The system of claim 12, wherein the structured data sources include historical pricing data, and the unstructured data sources include one or more of microblogging feeds, information in digital news articles, audio files, and corporate communications documents, the microblogging feeds including user-generated content disseminated in online interactions that further include one or more of text-based posts, text-based comments, digital photos, and videos files, and the audio files are digital audio files that are disseminated over computing networks as podcasts.

15. The system of claim 14, wherein the corporate communications documents include corporate communications data from one or more of securities-related regulatory filings published by corporate entities, debt-related regulatory filings published by corporate entities, and transcripts of earnings-related data sources.

16. The system of claim 12, wherein the specific knowledge relative to the selected equity derived from economic and equity-specific indicators is further derived from one or more of equity-specific technical analyses, equity-specific fundamental analyses, corporate communications data, relationships represented by personnel relative to the selected equity, and reports issued by governmental entities.

17. The system of claim 16, wherein the rules discovery engine is further configured to identify one or more rules impacting the state of the selected equity at the specified future time, develop at least one graphical representation of the one or more rules, and apply the at least one graphical representation to determine one or more of a numerical array comprised of one or more vectors and weights and biases for the one or more neural networks based on the one or more rules.

18. The system of claim 12, wherein the multi-layer machine learning-based model further includes curating a relevance-based taxonomy signature for the selected equity from the additional, temporally-dynamic predictors, by identifying specific parameters as indicators of one or more inter-equity relationships, inter-entity relationships or inter-industry relationships that define temporally-relevant time periods to quantify the relationships between data points within the set of classified content and the specific knowledge.

19. The system of claim 12, wherein the multi-layer machine learning-based model calculates an initial state of the selected equity within the specified future time based on the set of classified content representing the temporally-relative sentiment for the selected equity in a forecasting algorithm, and the neural network modeling layer is further configured to modify the initial state of the selected equity in a production neural network, develop a training neural network based at least on the discrete-time data points, and continually update the taxonomy as additional input data is ingested to develop a training data set for the training neural network.

20. The system of claim 12, wherein the neural network modeling layer calculates and assigns weights and biases for the threshold activation functions for the one or more neural networks based on the set of classified content representing a temporally-relative sentiment for the selected equity.

21. The system of claim 20, wherein the at least one deep learning meta network is configured to tune the weights and biases for the threshold activation functions for the one or more neural networks, by modeling different outcomes of the multi-layer machine learning-based model of the state of the selected equity based on the additional, temporally-dynamic predictors representing patterns in the taxonomy and the knowledge-based rules, and develop modified threshold activation functions based on the outcomes of the multi-layer machine learning-based model, to identify and apply the adjusted topologies for the one or more neural networks.

22. The system of claim 12, wherein the sentiment discovery engine is further configured to classify the input data for the multi-layer machine learning-based model by searching for one or more sentiment keys within a pre-defined proximity of each keyword or keyword pairing, calculating positive counts and negative counts for each occurrence of the one or more sentiment keys for the content to calculate the temporally-relative sentiment for the selected equity, converting the temporally-relative sentiment into a numerical array comprised of one or more text-based vectors representing a taxonomy signature for the selected equity, and classifying a historical performance of the selected equity to construct a sequence of the discrete-time data points indicative of the historical performance to define the temporal parameters relative to the selected equity for the specific future time.

23. A method, comprising:
classifying input data comprised of structured data sources and unstructured data sources to develop a data set for a multi-layer machine learning-based model configured to analyze a state of a selected equity within a specified future time, by
identifying one or more sentiment predictors for the selected equity from the unstructured data sources to develop a taxonomy comprising equity-specific keywords and keyword pairings for a selected equity, and modifying the modifying the taxonomy with temporal parameters relative to the selected equity for the specific future time representing discrete-time data points constructed from the structured data sources, to create a set of classified content representing a temporally-relative sentiment for the selected equity, and
deriving knowledge-based rules representing specific knowledge relative to the selected equity from economic and equity-specific indicators in the input data;
modeling the set of classified content and the knowledge-based rules within a neural network modeling layer comprised of one or more neural networks and at least one deep learning meta network, the neural network modeling layer configured to
represent the set of classified content and the specific knowledge as threshold activation functions for initiating a plurality of nodes and connections comprising a topology of the one or more neural networks to map the taxonomy and the knowledge-based rules into the one or more neural networks, and
tune the one or more neural networks in the at least one deep learning meta network, by identifying additional, temporally-dynamic predictors representing patterns in the taxonomy and the knowledge-based rules that quantify relationships between data points within the set of classified content and the specific knowledge, to modify the threshold activation functions for the plurality of nodes and connections of the one or more neural networks, and identify and apply adjusted topologies for the one or more neural networks based on the additional, temporally-dynamic predictors; and
performing the multi-layer machine learning-based model to forecast the state of the selected equity at the specified future time.

24. The method of claim 23, further comprising initiating at least one of a display of a forecasted state of the selected equity, a report of the forecasted state of the selected equity, and a recommendation based on the forecasted state of the selected equity.

25. The method of claim 23, wherein the structured data sources include historical pricing data, and the unstructured data sources include one or more of microblogging feeds, information in digital news articles, audio files, and corporate communications documents, the microblogging feeds including user-generated content disseminated in online interactions that further include one or more of text-based posts, text-based comments, digital photos, and videos files, and the audio files are digital audio files that are disseminated over computing networks as podcasts.

26. The method of claim 25, wherein the corporate communications documents include corporate communications data from one or more of securities-related regulatory filings published by corporate entities, debt-related regulatory filings published by corporate entities, and transcripts of earnings-related data sources.

27. The method of claim 23, wherein the specific knowledge relative to the selected equity from economic and equity-specific indicators is further derived from one or more of equity-specific technical analyses, equity-specific fundamental analyses, corporate communications data, relationships represented by personnel relative to the selected equity, and reports issued by governmental entities.

28. The method of claim 27, wherein the deriving knowledge-based rules representing the specific knowledge relative to the selected equity further comprises identifying one or more rules impacting the state of the selected equity at the specified future time, developing at least one graphical representation of the one or more rules, and applying the at least one graphical representation to determine one or more of a numerical array comprised of one or more vectors and weights and biases for the one or more neural networks based on the one or more rules.

29. The method of claim 23, further comprising curating a relevance-based taxonomy signature for the selected equity from the additional, temporally-dynamic predictors, by identifying specific parameters as indicators of one or more inter-equity relationships, inter-entity relationships or inter-industry relationships that define temporally-relevant time periods to quantify the relationships between data points within the set of classified content and the specific knowledge.

30. The method of claim 23, further comprising calculating an initial state of the selected equity within the specified future time based on the set of classified content representing the temporally-relative sentiment for the selected equity in a forecasting algorithm, wherein the neural network modeling layer is further configured to modify the initial state of the selected equity in a production neural network, develop a training neural network based at least on the discrete-time data points, and continually update the taxonomy as additional input data is ingested to develop a training data set for the training neural network.

31. The method of claim 23, wherein the modeling the set of classified content and the knowledge-based rules within the neural network modeling layer further comprises calculating and assigning weights and biases for the threshold activation functions for the one or more neural networks based on the set of classified content representing a temporally-relative sentiment for the selected equity.

32. The method of claim 31, wherein the at least one deep learning meta network is configured to tune the weights and biases for the threshold activation functions for the one or more neural networks, by modeling different outcomes of the multi-layer machine learning-based model of the state of the selected equity based on the additional, temporally-dynamic predictors representing patterns in the taxonomy and the knowledge-based rules, and develop modified threshold activation functions based on the outcomes of the multi-layer machine learning-based model, to identify and apply the adjusted topologies for the one or more neural networks.

33. The method of claim 23, wherein the classifying the input data comprised of structured data sources and unstructured data sources to develop the data set for the multi-layer machine learning-based model further comprises searching for one or more sentiment keys within a pre-defined proximity of each keyword or keyword pairing, calculating positive counts and negative counts for each occurrence of the one or more sentiment keys for the content to calculate the temporally-relative sentiment for the selected equity, converting the temporally-relative sentiment into a numerical array comprised of one or more text-based vectors representing a taxonomy signature for the selected equity, and classifying a historical performance of the selected equity to construct a sequence of the discrete-time data points indicative of the historical performance to define the temporal parameters relative to the selected equity for the specific future time.

* * * * *